(12) United States Patent
Xiao et al.

(10) Patent No.: US 10,941,778 B2
(45) Date of Patent: Mar. 9, 2021

(54) MOTORIZED PUMP

(71) Applicant: Saudi Arabian Oil Company, Dhahran (SA)

(72) Inventors: Jinjiang Xiao, Dhahran (SA); Rafael Adolfo Lastra Melo, Dhahran (SA); Chidirim Enoch Ejim, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/938,569

(22) Filed: Jul. 24, 2020

(65) Prior Publication Data

US 2020/0355184 A1    Nov. 12, 2020

Related U.S. Application Data

(63) Continuation of application No. 15/998,705, filed on Aug. 16, 2018.

(51) Int. Cl.
| | |
|---|---|
| *E21B 43/00* | (2006.01) |
| *F04D 1/04* | (2006.01) |
| *E21B 43/12* | (2006.01) |
| *F04D 1/06* | (2006.01) |
| *F04D 7/02* | (2006.01) |
| *F04D 13/08* | (2006.01) |

(52) U.S. Cl.
CPC .............. *F04D 1/04* (2013.01); *E21B 43/128* (2013.01); *F04D 1/06* (2013.01); *F04D 7/02* (2013.01); *F04D 13/086* (2013.01)

(58) Field of Classification Search
CPC . E21B 43/128; F04D 1/04; F04D 1/06; F04D 13/086; F04D 7/02
See application file for complete search history.

(56) References Cited

U.S. PATENT DOCUMENTS

| | | |
|---|---|---|
| 2,641,191 A | 6/1953 | Alfred |
| 2,782,720 A | 2/1957 | Dochterman |
| 4,586,854 A | 5/1986 | Newman et al. |
| 4,850,812 A | 7/1989 | Voight |

(Continued)

FOREIGN PATENT DOCUMENTS

| | | |
|---|---|---|
| WO | WO 2013171053 | 11/2013 |
| WO | WO 2015084926 | 6/2015 |

(Continued)

OTHER PUBLICATIONS

International Search Report and Written Opinion issued in International Application No. PCT/US2019/046624 dated Nov. 8, 2019, 12 pages.

(Continued)

*Primary Examiner* — David J Bagnell
*Assistant Examiner* — Yanick A Akaragwe
(74) *Attorney, Agent, or Firm* — Fish & Richardson P.C.

(57) ABSTRACT

An electrical submersible pump (ESP) and method for pumping fluid from a wellbore. The ESP has a motorized pump with an external rotor motor topology. The motorized pump fits into casing in the wellbore. The motorized pump includes a motor having a motor stator and a motor rotor. The motor stator is at a radial center of the motorized pump. The motorized pump has a centrifugal pump radially surrounding the motor stator. The centrifugal pump includes an impeller and a diffuser.

34 Claims, 15 Drawing Sheets

(56) References Cited

U.S. PATENT DOCUMENTS

| | | | |
|---|---|---|---|
| 5,158,440 | A | 10/1992 | Cooper et al. |
| 5,209,650 | A | 5/1993 | Lemieux |
| 5,261,796 | A | 11/1993 | Niemiec et al. |
| 5,494,413 | A | 2/1996 | Campen et al. |
| 5,649,811 | A | 7/1997 | Krol, Jr. et al. |
| 6,557,642 | B2 | 5/2003 | Head |
| 6,808,371 | B2 | 10/2004 | Niwatsukino et al. |
| 6,811,382 | B2 | 11/2004 | Buchanan et al. |
| 7,021,905 | B2 | 4/2006 | Torrey et al. |
| 7,262,532 | B2 | 8/2007 | Seidler et al. |
| 7,819,640 | B2 | 10/2010 | Kalaysky et al. |
| 8,905,728 | B2 | 12/2014 | Blankemeier et al. |
| 9,203,277 | B2 | 12/2015 | Kori et al. |
| 2003/0161739 | A1 | 8/2003 | Chu et al. |
| 2010/0206577 | A1 | 8/2010 | Martinez |
| 2013/0300833 | A1 | 1/2013 | Perkins |
| 2015/0192141 | A1* | 7/2015 | Nowitzki ............. F04D 29/426 166/105 |
| 2016/0169231 | A1 | 6/2016 | Michelassi et al. |
| 2016/0305447 | A1 | 10/2016 | Dreiss et al. |
| 2018/0171767 | A1 | 6/2018 | Huynh et al. |
| 2018/0363660 | A1 | 12/2018 | Klahn |
| 2019/0032667 | A1 | 1/2019 | Ifrim et al. |
| 2019/0040863 | A1 | 2/2019 | Davis et al. |
| 2019/0271217 | A1* | 9/2019 | Radov ..................... F04D 31/00 |

FOREIGN PATENT DOCUMENTS

| | | |
|---|---|---|
| WO | WO 2017021553 | 2/2017 |
| WO | WO 2018022198 | 2/2018 |

OTHER PUBLICATIONS

International Search Report and Written Opinion issued in International Application No. PCT/US2019/046623 dated Nov. 8, 2019, 13 pages.

Simpson, "A Tough, Truly Multiphase Downhole Pump for Unconventional Wells," Society for Petroleum Engineers, SPE-185152-MS, SPE Electric Submersible Pump Symposium, Apr. 24-28, 2017, 20 pages.

tm4.com' [online], "Outer rotor for greater performance," available on or before Dec. 5, 2017, via internet archive: Wayback Machine URL <https://web.archive.org/web/20171205163856/https://www.tm4.com/technology/electric-motors/external-rotor-motor-technology/>, [retrieved on May 17, 2017], retrieved from URL <https://www.tm4.com/technology/electric-motors/external-rotor-motor-technology/>, 2 pages.

* cited by examiner

MOTORIZED PUMP

CROSS-REFERENCE TO RELATED APPLICATIONS

This application claims priority to U.S. application Ser. No. 15/998,705, filed on Aug. 16, 2018, the entire contents of which are incorporated herein by reference.

TECHNICAL FIELD

The present techniques relate to a pump integrated with a motor

BACKGROUND

A pumping apparatus can include a hydraulic pump and electric motor as two separate components coupled via a rotating shaft. Pumps may be positive-displacement such as hydrostatic, gear, screw, diaphragm, etc., or non-positive-displacement such as hydrodynamic, centrifugal, propeller, etc. A pump is typically associated with an electric motor. Electric motors can be powered by direct current (DC) sources, such as from batteries, motor vehicles, or rectifiers, or by alternating current (AC) sources, such as a power grid, inverters, or generators.

An electrical motor may operate through interaction of the motor magnetic field with motor winding currents to generate force. The motor may include a motor stator and a motor rotor. The term "stator" is derived from the word stationary. The stator may be a stationary electrical component having a group of individual electro-magnets arranged in such a way to form a hollow cylinder, with one pole of each magnet facing toward the center of the group. The term "rotor" is derived from the word rotating. The rotor may be the rotating electrical component having a group of electro-magnets arranged around a cylinder, with the poles facing toward the stator poles. In some examples, the rotor may be located inside the stator and mounted on the motor shaft. These motor components can make the rotor rotate which in turn may rotate the motor shaft. This rotation may occur because of the magnetic phenomenon that unlike magnetic poles attract each other and like poles repel.

Thus, the motor rotor may be a moving component of the electromagnetic system in the electric motor. In particular, the interaction between the windings and magnetic fields produces a torque around the axis of the motor rotor to rotate the motor rotor. This force may rotate the shaft that couples the motor with the discrete pump.

A pump may be a submersible pump which is coupled to a submersible or hermetically-sealed motor separate from the pump body. The assembly may be submerged in the fluid to be pumped and thus generally avoid pump cavitation. Submersible pumps typically push the pumped fluid to the surface. Applications of submersible pumps include drainage, sewage pumping, sewage treatment plants, general industrial pumping, slurry pumping, pond filters, seawater handling, fire-fighting, water well and deep well drilling, offshore drilling rigs, artificial lifts, mine dewatering, and irrigation systems. Submersible pumps may be lowered down a borehole and used for residential, commercial, municipal and industrial water extraction, and in water wells and oil wells. Lastly, for a submersible pump system, a seal section or protector is typically disposed between the pump and motor for motor protection. The protector may absorb the thrust load from the pump, transmit power from the motor to the pump, equalize motor internal and external pressures, and prevent well fluids from entering the motor.

SUMMARY

An aspect relates to a motorized pump to pump fluid. The motorized pump includes a shaft disposed in a center portion of the motorized pump, a motor having a motor stator, and a pump having an internal diffuser and an external impeller, wherein the motor stator radially surrounds the pump. A housing radially encloses the motor stator, the internal diffuser, and the external impeller. The motor stator is disposed adjacent the housing.

Another aspect relates to a motorized pump including a shaft disposed at a center portion of the motorized pump. The motorized pump includes a motor with a motor stator having laminations and windings. The motorized pump includes a multi-stage centrifugal pump having multiple hydraulic stages, each hydraulic stage having an internal diffuser and an external impeller, the external impeller for fluid pumped by the motorized pump. A housing radially encloses the motor stator, the internal diffusers, and the external impellers. The motor stator radially encloses the pump.

Yet another aspect relates to a method of operating an electrical submersible pump (ESP) having a motorized pump, the method including: pumping, by the motorized pump of the ESP, production fluid from a wellbore, wherein the motorized pump has a pump and a motor stator radially enclosing the pump. The pump has an external impeller and an internal diffuser. The pumping involves receiving the production fluid at an inlet of the pump, receiving the production fluid at the external impeller and rotating the external impeller around a shaft of the motorized pump, flowing the production fluid through a flow path of the internal diffuser.

The details of one or more implementations are set forth in the accompanying drawings and the description below. Other features and advantages will be apparent from the description and drawings, and from the claims.

DETAILED DESCRIPTION

Figure 1:
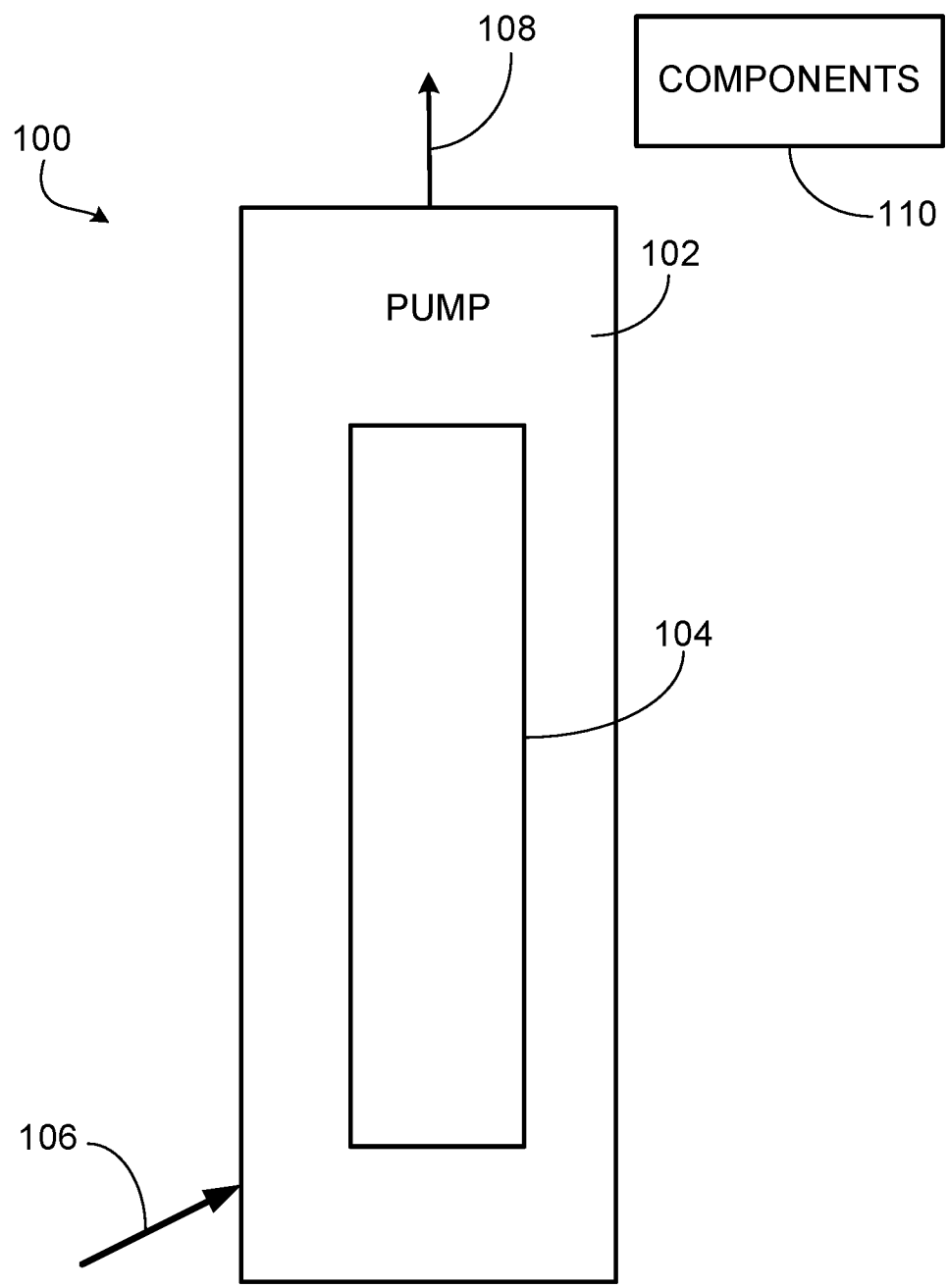
FIG. 1 is a diagram of a motorized pump.

A submersible pump system may have both downhole components and surface components. The downhole components may include a motor, seal (protector), pump, and cable. Additional downhole components may include data acquisition instrumentation, motor lead extension, cable bands, gas separator, and check and drain valves. The surface components may include a transformer, electrical junction box, and motor controller such as a variable speed controller.

Submersible pumps in oil production may provide for "artificial lift." These pumps are typically electrically powered and commonly referred to as an electrical submersible pump (ESP). The ESP pump may be relatively long and slender, and may be disposed in wellbores to lift or pump fluids from the wellbores. Some ESP systems can fit and operate in wellbore casings as small as 4.5-inch outside diameter. ESPs can be centrifugal pumps operated in a vertical position, deviated position, or horizontal position. As discussed below, the pump may be composed of several impellers, blades, diffusers, vanes, etc. that apply head to and move the fluids within the well.

ESPs can be an electro-hydraulic system having a centrifugal pump and electric motor in addition to a sensory unit and a power delivery cable. The power delivery cable supplies the motor with electrical power from the surface. The motor converts electric power to mechanical power to drive the pump via a shaft or other components. The pump lifts and discharges well fluids to the surface.

A centrifugal pump may be so named because the head added to fluid is due at least in part to centrifugal effects. By stacking impellers and diffusers (multi-staging), the desired lift or total dynamic head (TDH) may be achieved. Indeed, the pump may have stages made up of impellers and diffusers. The rotating impeller adds energy to the fluid as kinetic energy, whereas the stationary diffuser converts the kinetic energy of fluids into head. The pump stages are typically stacked in series to form a multi-stage system contained within a pump housing. The head generated by each individual stage may be summative. Hence, the total head developed by the multi-stage system generally increases from the first to the last stage. ESP systems may employ a centrifugal pump below the level of the reservoir fluids. Moreover, submersible pumps may be a single-stage pump or a multi-stage pump. For instance, ESPs can be multistage centrifugal pumps operated in a vertical position.

In operation, the ESP receives the well fluids, applies artificial lift by spinning the impellers (vanes) on the pump shaft to apply pump head on the surrounding fluids to force the fluids toward the surface. In some instances, the ESP can lift more than 25,000 barrels of fluids per day. ESP systems can pump a variety of fluids. Common fluids pumped are production fluids such as crude oil and brine. The pumped fluids may include oil, gas, natural gas, liquid petroleum products, disposal and injection fluids, solids or contaminates, carbon dioxide ($CO_2$) and hydrogen sulfide ($H_2S$) gases, treatment chemicals, and so forth. Some ESPs can handle corrosive fluids, abrasive contaminants such as sand, downhole temperatures, levels of gas production, and so on. ESPs may be deployed in vertical, deviated, and horizontal wells.

As for installation, the downhole components of the ESP system may be installed via the bottom of the tubing string. Indeed, the ESP system electric motor and pump, such as a multistage centrifugal pump, may be run on a production string and connected back to a surface control mechanism and transformer via the electric power cable. As mentioned, an electric cable generally runs the length of the well, connecting the pump to a surface source of electricity.

An ESP can pump intermittently or continuously. An ESP can be adapted to automation and control systems, and generally includes a surface control package. Numerous surface control and communication devices are generally available for an ESP pump. The controller can be weatherproof and situated outdoors, or an indoor version placed in a building or container. The control equipment can be located near the wellhead or up to several miles away.

ESP legacy technology may face at least two challenges: reliability and intervention cost. Low reliability may be attributed to the system complexity both mechanically and electrically, compounded by the harsh operating environments. Intervention costs may be due to rig dependency for system deployment, retrieval, and replacement. The rig dependency may be partially due to the ESP system length.

In contrast, embodiments herein improve reliability and provide for rigless deployment. In some examples, component functionalities are eliminated or combined to achieve better reliability. For instance, certain implmentations eliminate the protector section by employing magnetic coupling between the motor and pump. Embodiments combine the motor with the pump to give a motorized pump where the motor and the pump are built as one combined unit.

The present disclosure includes a pumping apparatus with a motor enclosed within. Unlike a conventional pumping system where the pump and the motor are separated components linked together with a shaft (and in typical downhole applications having a protector section sitting in between for motor protection), certain embodiments herein provide for the pump and the motor integrated as one unit, and without a shaft or a protector section. Radially for some embodiments, from inside to outside, the system may be made of the motor stator, the motor rotor and pump rotor, the pump stator, and the housing. The motor stator has windings and can be energized with direct current (DC), or one-phase or three-phase alternating or alternative current (AC). The motor rotor can be an induction type design having steel laminations with copper bars and end ring. Alternatively, the motor rotor can be a permanent magnet design with steel laminations having permanent magnets mounted on an inside diameter (ID), or embedded within, to engage electromagnetically with the motor stator.

In certain implementations, the outside diameter (OD), or OD portion, of the motor rotor is constructed with or integrated with a pump rotor. The pump rotor has hydraulic elements such as vanes or helical vanes. The motor rotor together with the pump rotor rotates within the pump stator. The pump stator also has hydraulic elements such as helical vanes on the ID to engage hydraulically (also mechanically for positive displacement pump design) with the pump rotor vanes to pump fluids.

The techniques may include an external-rotor motor design and integration with a pump. The pump and motor may be contained within a housing. In all, advantages may include higher motor torque capability, larger pump OD to have a higher head generation capability, system compactness, and so on.

The pump system can be manufactured for surface use or for downhole applications. The pump can be a positive displacement type or centrifugal type. Positive displacement types include screw pump, progressive cavity pump, etc.

Centrifugal types include multi-stage centrifugal pump, helico-axial pump, etc. Again, the motor can be an induction motor or permanent magnet motor. For downhole applications, the system can be deployed with a rig at the end of the tubing or riglessly with the power cable inside the tubing, and the like. The motorized pump may have be have a reduced string length which may facilitate rigless operation to be carried out and without killing the well. The disclosure gives innovative techniques to unify motor and pump, and which may simplify system configurations.

In summary, embodiments of the present techniques include a motorized pump having a pump and motor integrated as a single (combined) unit. The motor rotor may be constructed with or integrated with the pump rotor. In some examples, the motor rotor together with the pump rotor rotates within the pump stator. The motor may have an external rotor motor configuration and is within the pump. In certain implementations, the pump may surround or enclose the motor. Radially, from inside to outside, the unit may include: (a) motor stator, (b) motor rotor and pump rotor, (c) pump stator, and (d) a housing. If a housing is employed, the pump and motor are contained within the housing. The pump rotor has hydraulic elements such as vanes or helical vanes. The pump stator has hydraulic elements, such as vanes or helical vanes, on its inside diameter (ID) to engage hydraulically with the pump-rotor hydraulic elements to pump fluids. This engagement may be mechanical for positive displacement pumps.

Turning now to the drawings, FIG. 1 is a motorized pump 100 having a pump 102 and a motor 104 as an integrated unit. The pump 102 can be a positive displacement pump or a centrifugal pump, and the like. The motor 104 may be an induction motor, permanent magnet motor, and so forth. The motor 104 may include a motor stator and a motor rotor. The motor 104 may drive the pump 102.

In examples, the pump rotor is the motor rotor or is integrated with the motor rotor. For example, pump hydraulic elements, such as vanes, can reside on the motor rotor to make the motor rotor both a motor rotor and a pump rotor. Thus, in examples, the motor rotor and pump rotor may effectively be the same overall component.

Moreover, in some embodiments, the pump 102 is radially to the outside of the motor 104. Indeed, the pump 102 may cylindrically or radially surround the motor 104. In the illustrated embodiment, the pump 102 encloses the motor 104. See also, for example, FIGS. 5, 8, 9, and 13.

In other embodiments, the motor 104 may be radially to the outside of the pump 102. See, for example, FIGS. 3 and 11. In those embodiments, the motor 104 may surround or enclose the pump 102.

In FIG. 1, in operation, the fluid to be pumped is received, as indicated by arrow 106, at an inlet such as a suction or intake. The pump 102 discharges the pumped fluid, as indicated by arrow 108. The pump 100 system may be an electrical submersible pump (ESP) system. The pump system 100 includes additional components 110, such as surface components. ESP pump 100 systems may consist of both surface components 110 such as those housed in the production facility or oil platform, and subsurface components such as the integrated pump 102 and motor 104 in the well hole or wellbore.

The ESP that employs the motorized pump 100 may be labeled as an ESP system and which pumps or lifts fluid from a well or wellbore. The fluid may be or include hydrocarbon such as oil and gas. The ESP motorized pump 100 can be sized and arranged for insertion downhole into a wellbore. Depending on the application, the motorized pump 100 may be sized to fit into a wellbore casing having an outer diameter as small as 4.5 inches. Furthermore, the pump 102 and motor 104 may be sized to lift the volume of fluid production from the wellbore. Moreover, the motor 104 may be powered from the surface via, for example, a submersible electric cable.

In some examples, the pump 102 is a centrifugal pump or a multi-stage centrifugal pump. Again, the pump 102 typically has an inlet as an intake or fluid suction. The inlet may have an intake screen in some embodiments. In operation, fluids enter the pump 102 through the inlet. Thus, the pump 102 receives fluid through the inlet and discharges 108 the pumped fluid from an opposite end on an upper portion of the pump 102. Fluid or liquids accelerated by the hydraulic element, such as a pump rotor or impeller, may lose kinetic energy in a stationary element or diffuser where a conversion of kinetic energy to pressure energy takes place. The fluids are lifted by the pump stage or stages. Other ESP motorized pump 100 parts may include radial bearings or bushings that provide radial support, thrust bearings, and so on.

Figure 2:
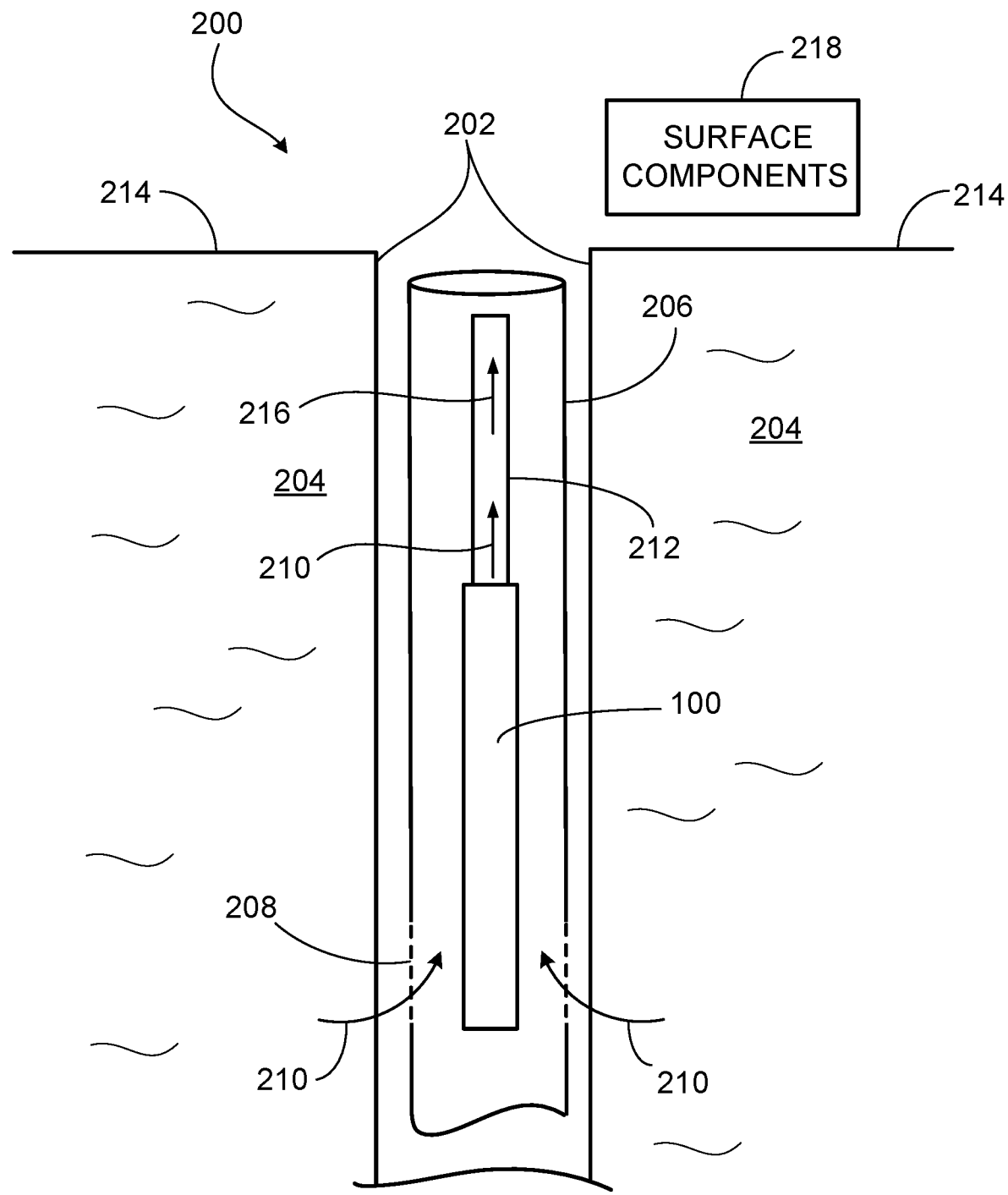
FIG. 2 is a diagram of production site including an electrical submersible pump (ESP) motorized pump in a wellbore.

FIG. 2 is an oil and gas production site 200 including a hole or wellbore 202 drilled into the Earth 204 (formation). A wellbore casing 206 is positioned in the wellbore 202. The casing 206 may have holes, slots, or perforations 208 to receive hydrocarbon fluid 210, such as oil and gas, from the formation. In the illustrated embodiment, the motorized pump 100 as an ESP integrated pump/motor 100 is lowered as a downhole component into the wellbore casing 206. In operation, the ESP integrated pump/motor 100 receives the hydrocarbon fluid 210, applies pump head to the fluid 210, and discharges the fluid 210 through a production conduit 212 toward the Earth surface 214, as indicated by arrow 216. As discussed, an ESP motorized pump 100 system generally includes a pump fluid intake or inlet. The motorized pump discharge may include protective devices, such as a check valve, drain valve, etc. In addition, ESP downhole components may include a cable, cable guard, cable clamps, gas separator, sensor and data acquisition instrumentation, and so forth.

The ESP surface components 218 of the ESP motorized pump 100 may include surface controls. Indeed, an ESP 100 typically has the surface equipment 218 such as an electrical transformer and system controller. Some ESP motorized pump 100 examples include a variable frequency drive. Also, ESP motorized pump 100 components may include a motor lead extension in addition to the power cable. For instance, an electrical main cable and a cable motor-lead extension may connect surface equipment with the ESP motor 104 and a well-monitoring device. A monitoring submersible tool may be installed onto the motor to measure parameters such as pump intake and discharge pressures, intake and motor oil temperature, and vibration. Measured downhole data may be communicated to the surface via the power cable.

Some ESP motorized pump 100 examples may include a gas handler or gas separator at or near (or combined with) the pump intake or inlet 106. Gas separators may be employed where free gas causes interference with pump performance. The gas separator may separate some free gas from the fluid stream entering the pump to improve pump performance. Yet, in some examples of the pump 102 as a helico-axial pump with higher rotation speed, for example, 4000 revolutions per minute (rpm) or greater, and with no radial or mixed-flow pump, a gas separator can be avoided in certain embodiments. Indeed, some ESP motorized pump 100 embodiments with a helico-axial pump 102 and permanent magnet motors 104 do not have this gas separator because significant benefit may not be realized in certain instances with the gas separator. Some examples of a helico-axial pump 102 can function as a compressor and handle, pump, and process fluid with high gas volume fraction such as greater than 70 percent (%).

Figure 3:
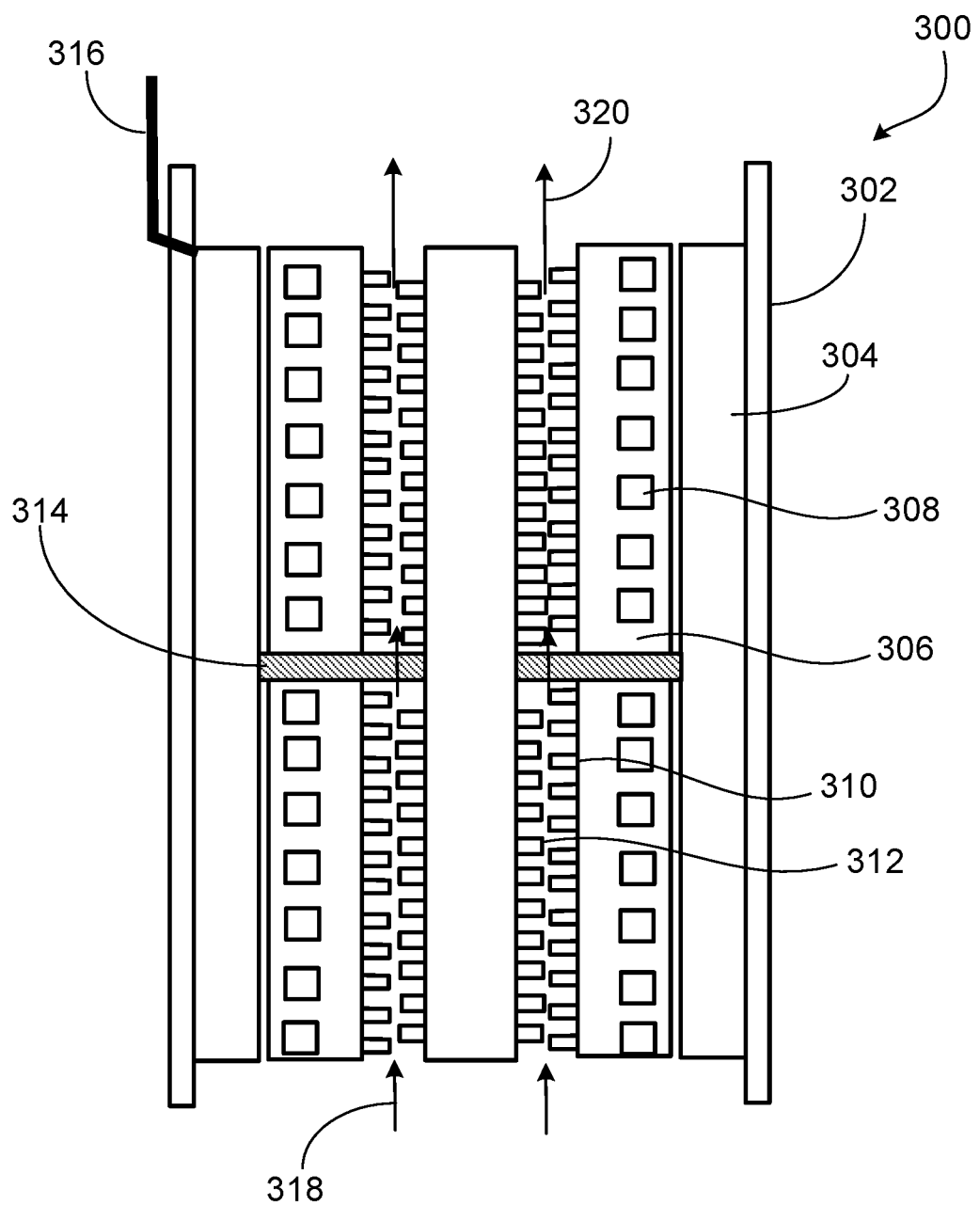
FIG. 3 and FIG. 3A are respective diagrams of different motorized pumps.

FIG. 3 is a motorized pump 300 with the motor and the pump built as one combined unit. In this example, the combined unit is housed inside a housing 302 such as a steel housing. Within the housing, the pump system is driven by and encased within the motor.

The motor stator 304 has laminations, such as steel laminations, compressed together. Slots are cut within the laminations to facilitate installation of magnetic coils. In operation, once the stator 304 is energized, rotating magnetic fields may be generated. Laminations may be the steel portions of a motor stator and rotor, and composed of thin lamination sheets stacked together. These laminations can be stacked "loose," welded, or bonded together depending on the application. In some examples, the motor stator or rotor can be solid piece. However, the motor stator or rotor may instead more typically be the motor laminations sheets, for example, to reduce eddy current losses.

The motorized pump 300 includes an integrated motor rotor 306 and pump rotor 306. The motor rotor 306 portion of this integrated motor rotor/pump rotor 306 can be an induction type design with bars, such as copper bars, installed within the stack of steel laminations and short circuited with end rings. Another option is for the motor rotor 306 to employ permanent magnets 308, as illustrated in FIG. 3. These permanent magnets 308 of the motor rotor 306 engage magnetically with the rotating magnetic fields of the motor stator 304 such that torque and rotation of the motor rotor 306 is generated.

Again, the motor rotor 306 is integrated with the pump rotor 306. In other words, the interior side or portion of the motor rotor 306 may be the pump rotor 306. Indeed, on the interior surface of the motor rotor 306 are hydraulic elements 310, such as vanes or helical vanes, built on the surface as pump elements, making the motor rotor 306 and the pump rotor 306 an integral unit.

In the illustrated example, the stationary pump stator 312 is situated at the center of the motorized pump 300 unit. The external surface of the pump stator 312 is built with corresponding hydraulic elements, such as helical vanes, which engage hydraulically with the pump rotor 306 hydraulic elements to move or pressurize, or apply head to, fluids being pumped such as production fluids.

Further, the depiction in FIG. 3 is two hydraulic stages of the pump 300. The motorized pump 300 system can be built with multiple motor/pump rotors (more than two) to meet the pumping requirement. The pump 300 can include respective radial bearings 314 between adjacent rotors. The pump illustrated in FIG. 3 is a helico-axial centrifugal pump. However, the current disclosure is not limited to a helico-axial centrifugal pump but can be another type of centrifugal pump, a screw pump, progressive cavity pump, and so on. The motorized pump 300 includes a power cable 316 to supply power to the motor.

The flow of pumped fluid through the motorized pump 300 is indicated by arrows 318 as entering the depicted inlet or upstream stage and by arrows 320 as discharging from the depicted outlet or downstream stage. Lastly, in certain embodiments of the motorized pump 300 as an ESP, the pump stator 312 can be hollow and can incorporate a nipple profile facilitating the hollow passage to be blocked during production and open for well logging or stimulation.

Figure 3A:
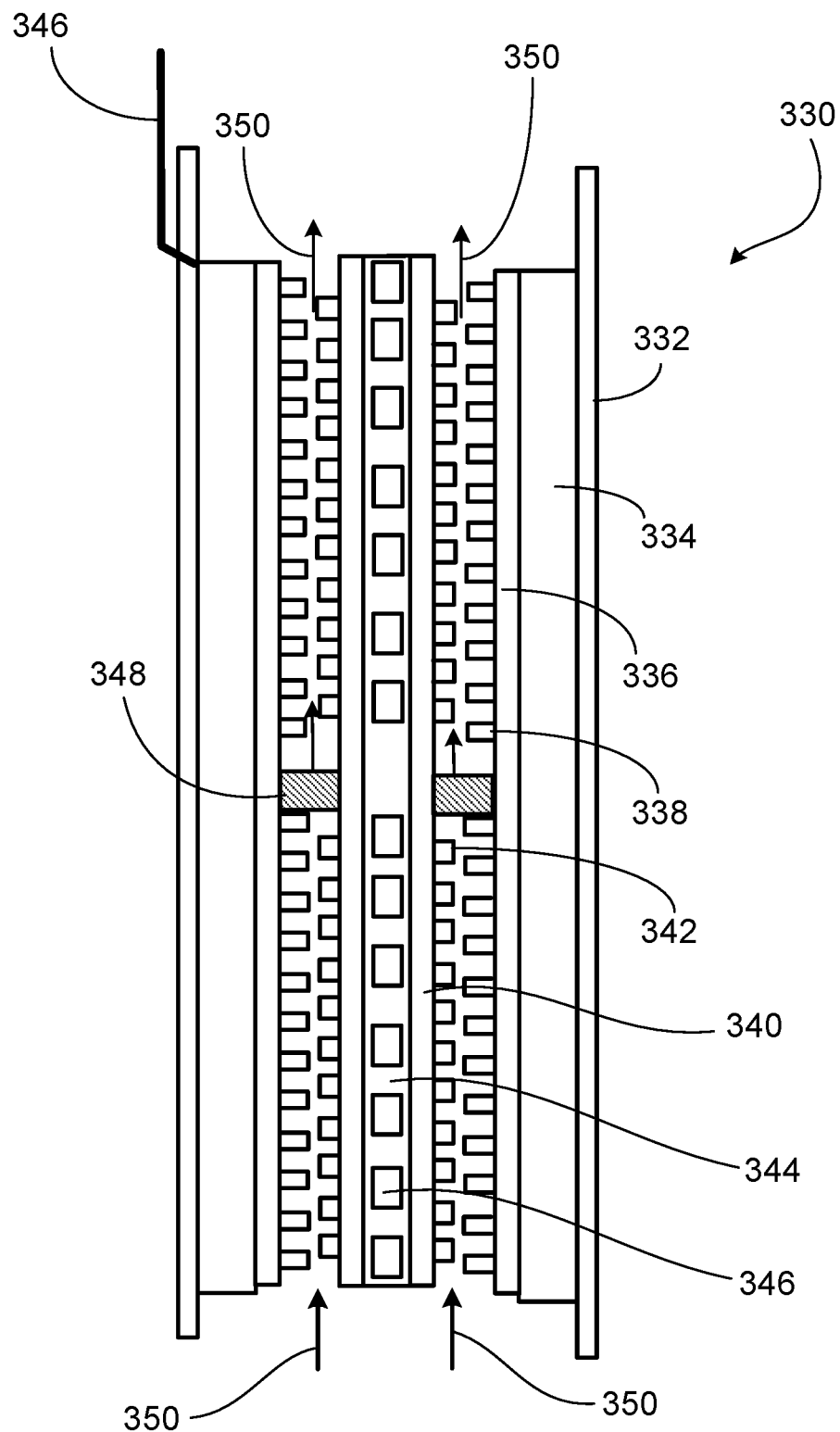

FIG. 3A is a motorized pump 330 (two stages depicted) having a motor and pump within a housing 332. The motor stator 334 has laminations and magnet wire windings. The pump stator 336 with vanes 338 is installed inside the motor stator 334 and integrated with or attached to the motor stator 334. The pump stator 336 and the vanes 338 may be constructed of metals and other materials. Similarly, the pump rotor 340 and pump rotor vanes 342 may be constructed of metals and other materials. The pump rotor 340 is integrated or attached to the motor rotor 344 which, in this example, is situated at the center of the system. The motor rotor 344 is made with stacks of laminations and with multiple high-strength permanent magnets 346 (for example, samarium cobalt or neodymium) embedded within. Once the motor stator 334 is energized, its rotating magnetic fields will drive the motor rotor 344 to rotate, and fluids can be pumped. The material of the pump stator 336, rotor 340 and vanes may promote electromagnetic coupling and cooling due to heat conductive characteristics.

Figure 4:
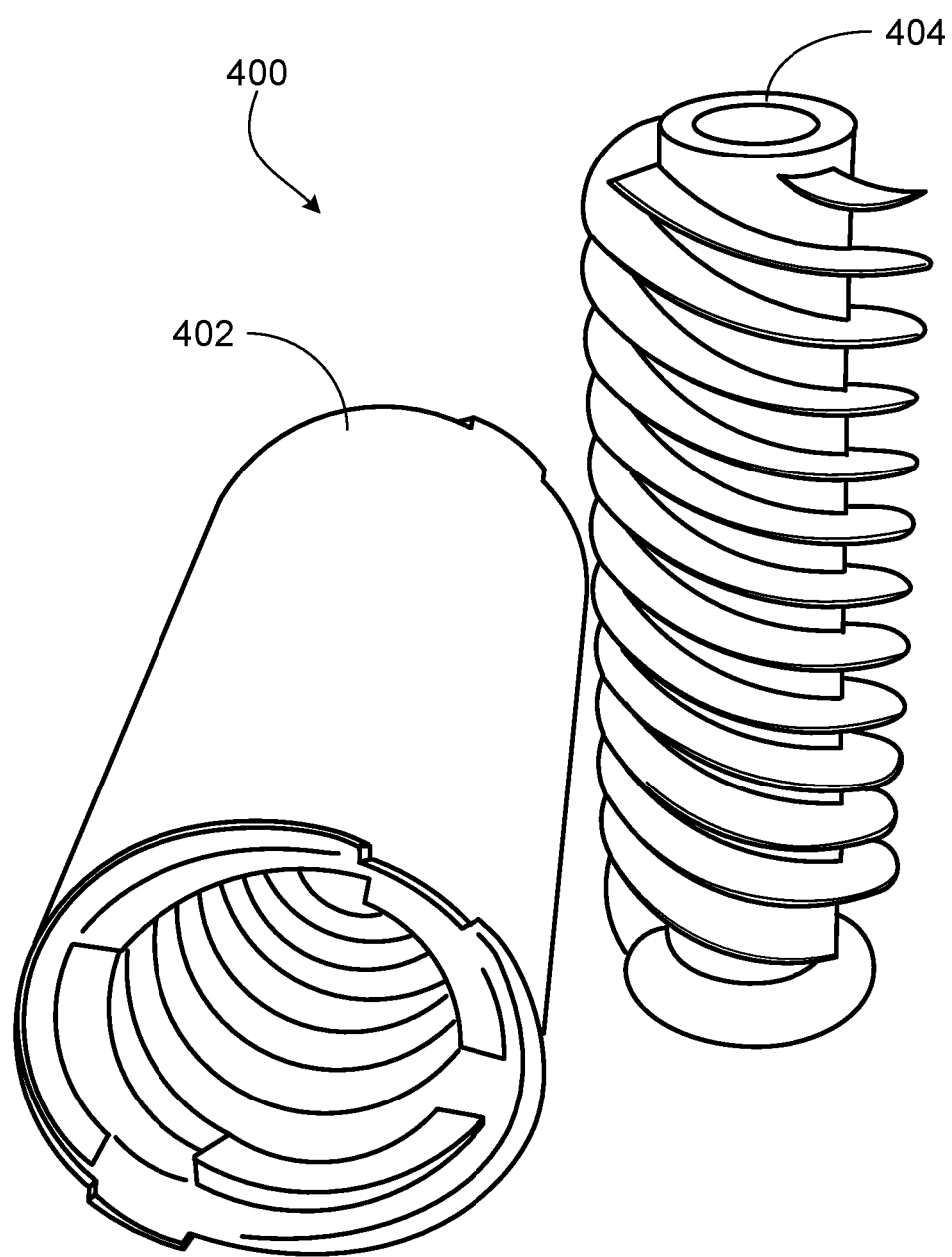
FIG. 4 is a perspective view of a helical-axial pump stator and rotor.

The motorized pump 330 includes a power cable 346 to supply power to the motor. The pump 330 can included radial bearings 348 between adjacent rotors of the two depicted stages. Moreover, the flow of pumped fluid through the motorized pump 300 during operation is indicated by arrows 350. Lastly, FIG. 4 is a typical helical-axial pump 400 stator 402 and rotor 404 and in which its principal of operation may be incorporated in the motorized pump 300 of FIG. 3 or the motorized pump 330 of FIG. 3A.

Figure 5:
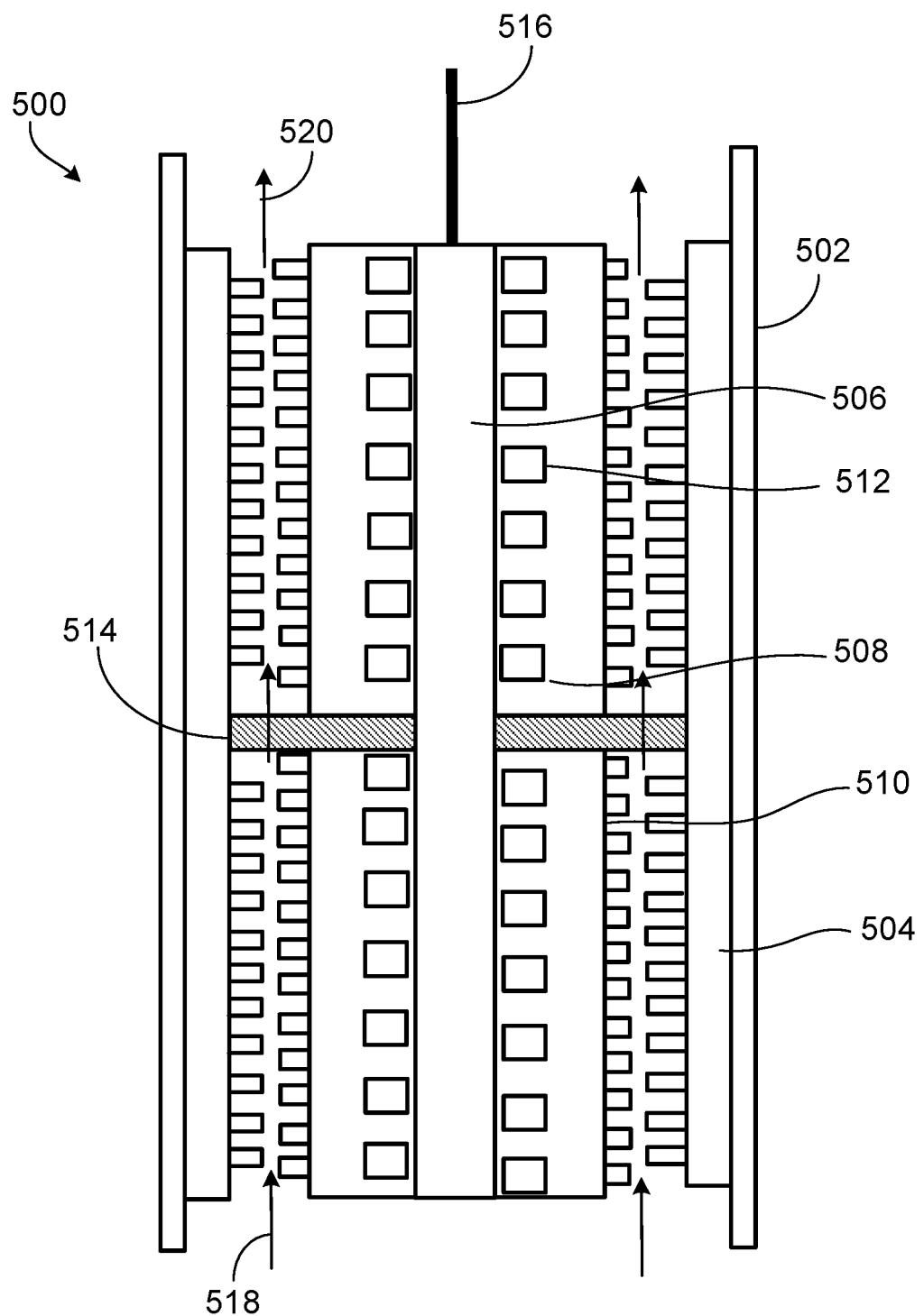
FIG. 5 is a diagram of a motorized pump which may have an external rotor motor.
Figure 5A:
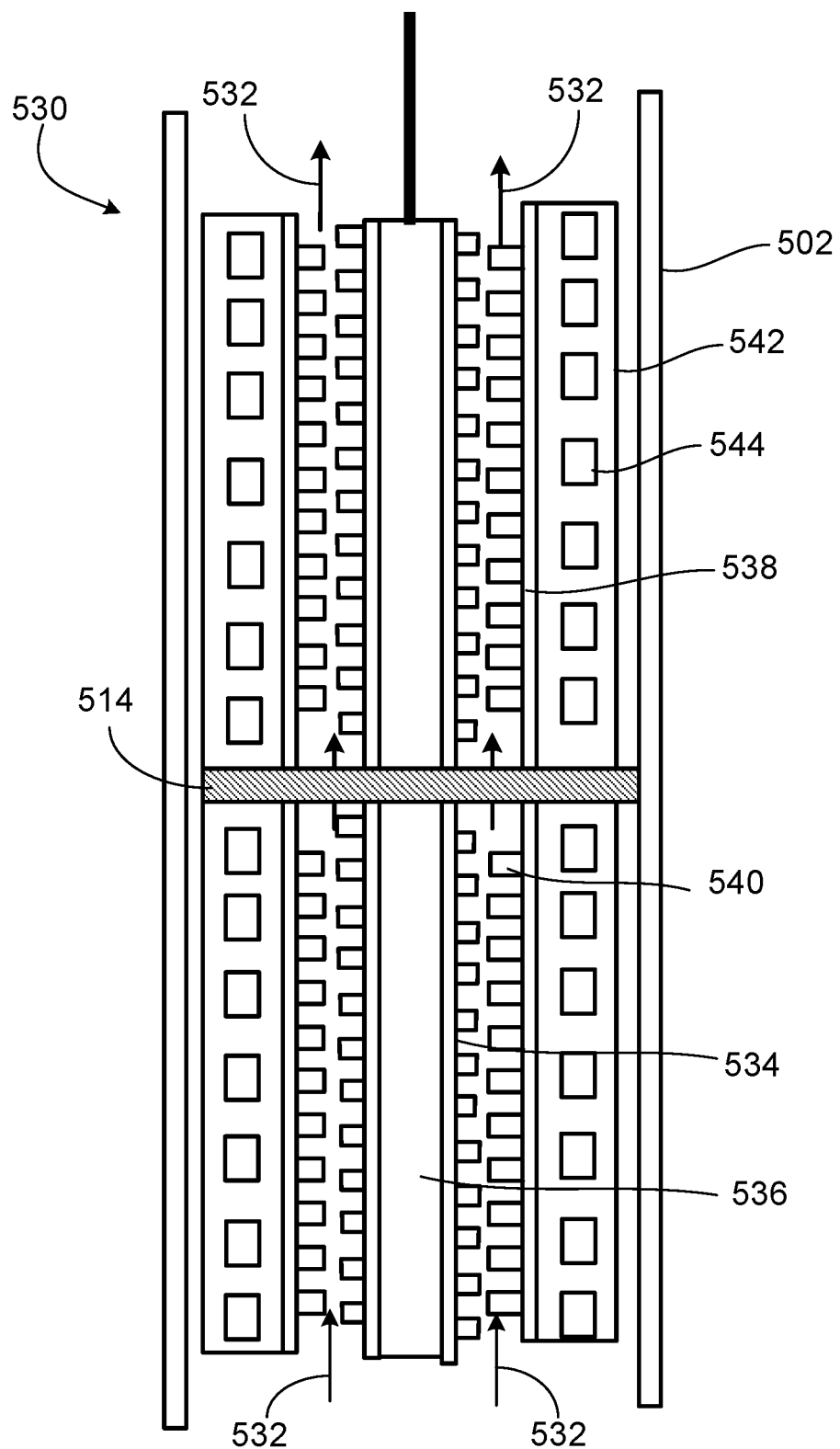
FIG. 5A is a diagram of a motorized pump which may have an external rotor motor.

A potential drawback with various embodiments of FIG. 3 or FIG. 3A is the pump OD may be limited because the pump is internal of the motor. These configurations of the pump inside the motor may be due, at least in part, to employment of the motor as an internal rotor motor. Other embodiments, such as that depicted in FIG. 5, employ an external rotor motor. FIGS. 5 and 5A are motorized pumps that employ an external rotor motor.

FIG. 5 is a motorized pump 500 with the motor and pump as one unit. Again, the motor in the illustrated embodiment is an external rotor motor. The motorized pump 500 includes a housing 502, a pump stator 504 with vanes (for example, helical vanes), and a motor stator 506 with laminations and windings. The pump stator 504 is not in a locked position with the motor stator 506.

The motorized pump 500 includes a motor rotor 508 and a pump rotor 510 with vanes integrated with the motor rotor 508. Permanent magnets 512 are disposed on the motor rotor 508. In examples, at the center of the motorized pump 500 unit is the motor stator 506 which can be made of a stack of steel laminations compressed together, and within these laminations, slots cut for magnetic wire windings. In operation, as electric power is supplied to the motor stator 506 windings, rotating magnetic fields may be generated.

In the illustrated embodiment of FIG. 5, the motor rotor 508 radially encloses the motor stator 506. This configuration can be characterized as turning a typical or conventional motor inside out. Further, the pump and motor are radially arranged, as opposed to the conventional axial arrangement. Moreover, the pump (including the pump stator 504 and the pump rotor) radially encloses or surrounds the motor (including the motor stator 506 and the motor rotor 508). While only two hydraulic stages (centrifugal pump stages) are depicted in FIG. 5 for clarity, the motorized pump 500 can have more hydraulic stages (in the axial direction).

Further, at the bottom in the axial direction, the motorized pump 500 may have an intake (not shown) disposed radially across completing the motorized pump 500 and that receives the fluid 518 (for example, production fluid) to be pumped.

In addition, at the top in the axial direction, the motorized pump 500 may have a discharge head disposed radially across completing the motorized pump 500 and that discharge the pump fluid 520 (for example, production fluid) exiting the motorized pump 500.

FIG. 5 depicts the motor rotor 508 with permanent magnets 512. However, the motor rotor 508 can instead be an induction type with copper bars inside a stack of steel laminations and short circuited with end rings. Yet, the motor may generally be more compact with permanent magnets 512. Electromagnetic interaction between the motor stator 506 magnetic fields and the permanent magnets 512 generates torque and rotation.

The OD or external surface of the motor rotor 508 has vanes, such as helical vanes, resulting in an integral motor rotor 508 and pump rotor 510. As the rotor rotates, these vanes engage hydraulically with the corresponding vanes on the stationary pump stator 504 to move or apply pump head to the pumped fluids such as production fluids. With the pump generally including radially outside of the motor, some embodiments associated with FIG. 5 can provide a relatively larger pump OD, enhancing pump hydraulic-head generation.

In addition, with the motor stator 506 at the center, the configuration may lend to rigless cable deployment. The concentricity of the cable and the motor stator 506 facilitates easy make-up between the two components for rigless cable deployment.

The motorized pump 500 may include a radial bearing 514 disposed axially between the rotors of the two adjacent stages. Further, a power cable 516 is typically included to supply power to the motor. For the motorized pump 500 as an ESP, power may be supplied via the power cable 516 from the surface. In operation, pumped fluid (production fluid) flows though the motorized pump 500 stages, as indicated by arrows 518 and 520.

Again, the motor rotor 508 and pump rotor 510 are integrated. For instance, the motor rotor 508 and pump rotor 510 effectively share the same rotor in certain examples. Indeed, the permanent magnets of the motor rotor 508 and the vanes of the pump rotor 510 are both on the laminations of the motor rotor 508.

The pump rotor 510 vanes are typically machined. Also, for some embodiments, pump vanes are not positioned within the passage of the motor stator 506 but instead are radially outside of the motor stator 506.

FIG. 5A is a motorized pump 530 that also employs an external rotor motor. The pumped fluid flow 532 through the pump 530 may be similar to the pumped fluid flow through the motorized pump 330 of FIG. 3A. In FIG. 5A, the motorized pump 530 includes a pump stator 534 with vanes. The pump stator 534 is attached to the motor stator 536. Indeed, the pump stator 534 vanes are integrated with the motor stator 536. The motor stator 536, which has laminations and windings, is in the center of the motorized pump 530. The pump rotor 538 with vanes 540 is attached to (integrated with) the motor rotor 542 which has laminations and permanent magnets 544. In some examples, the pump stator 534, rotor 538/542, and/or vanes may be constructed of heat conductive metal.

As indicated, an aspect of embodiments of FIG. 5 and FIG. 5A is an external rotor motor. In some examples, the motor stators 506 and 536 have laminations, slots, and magnet wires with the windings of the magnet wires configured such that the electromagnetic fields project outward for effective engagement with the external rotor.

Compared with rotor-centric permanent magnet motors, the external rotor motor topology where the rotor rotates on the outside of the stator may have a greater magnetic flux, resulting in higher power density or higher torque density. This higher density in some examples may facilitate the motor to be smaller and thus the pump to be larger where radially limited such as downhole.

Figure 6:
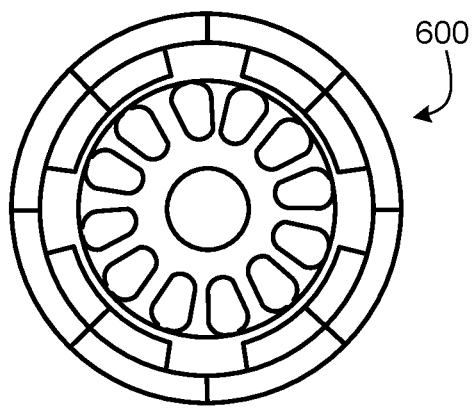
FIG. 6 is a diagram of a general representation of an outer rotor technology.
Figure 7:
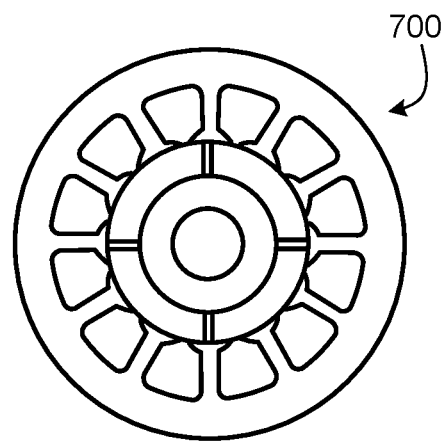
FIG. 7 is a diagram of a general representation of an inner rotor technology.

FIG. 6 is a general representation 600 of outer rotor technology with an outer rotor permanent magnet motor. FIG. 7 is a general representation 700 of inner rotor technology with an inner rotor permanent motor.

Figure 8:
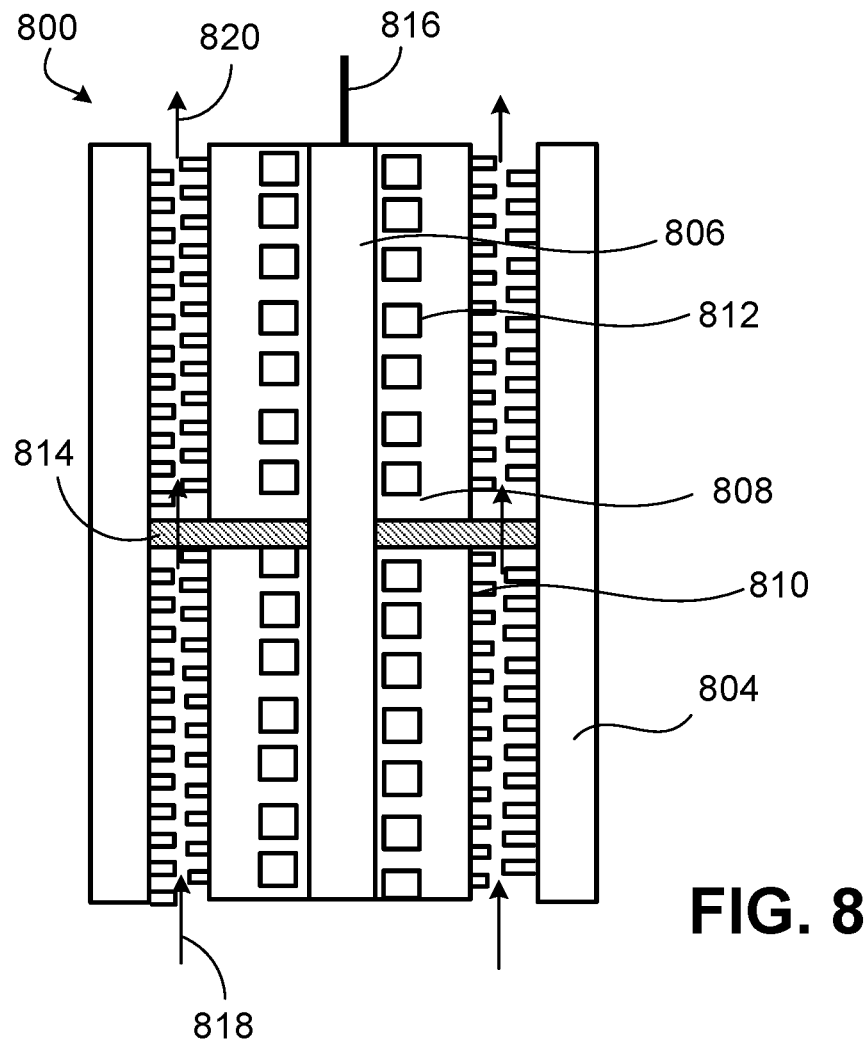
FIG. 8 is a diagram of a motorized pump without an outer housing.

FIG. 8 is a motorized pump 800 having a pump around a motor, and which may be a variation of the pump 500 of FIG. 5 without the housing 502. In this example, the pump stator 804 (with vanes) has sufficient strength to withstand the pressure and tensile load for downhole applications. For example, the pump stator 804 may be high-strength material with sufficient wall thickness. In downhole applications, radial dimension can be limited. The motorized pump 800 without an outer housing may facilitate the pump to have a larger outside diameter within a limited radial dimension of a wellbore, leading to higher flow rates and head-generation capability. In the illustrated embodiment, the pump stator 804 is the outer layer of the motorized pump 800.

The motorized pump 800 has motor stator 806 with laminations and windings, an integrated motor/pump rotor 808 having pump rotor vanes 810 and motor-rotor permanent magnets 812. The motorized pump 800 has radial bearings 814 and a power cable 816. The motorized pump 800 may be downhole components (motor and pump) of an ESP system without a housing.

Figure 9:
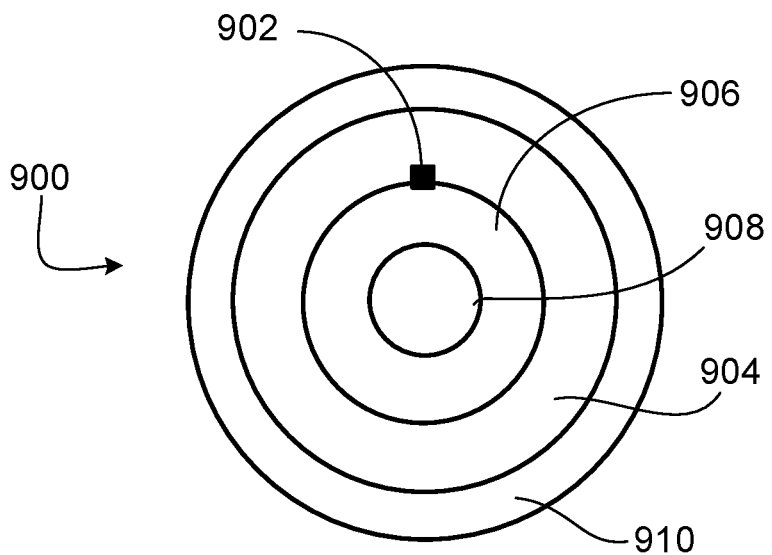
FIG. 9 is an end diagram of a layered representation of a motorized pump.

FIG. 9 is a radial cross-section representation of a motorized pump 900 depicting subcomponents as layers to note relative position. The pump surrounds or encloses the motor. The motorized pump 900 includes a key or O-ring 902 to lock the pump rotor 904 with the motor rotor 906. The motor rotor 906 may have permanent magnets or an induction design. The motor rotor 906 can be a squirrel cage induction type. The motorized pump has a motor rotor bore 908 and pump rotor vanes.

The motorized pumps in FIGS. 3, 3A, 5, 5A, and 8 are multi-stage pumps with only two of the stages depicted for clarity. Moreover, in examples of these motorized pumps in FIGS. 3, 5, and 8, an air gap between motor stator and motor rotor is not used for pumping or flowing pump fluid there through. In other words, in those embodiments, the pumped fluid passage is not between the motor stator and the motor rotor. However, the examples depicted in FIGS. 3A and 5A may use this air gap for pumping. In addition, examples of the motorized pumps of FIGS. 3, 3A, 5, 5A, 8, and 9 do not include diffusers. Further, the motorized pumps depicted in FIGS. 3, 3A, 5, 5A, 8, and 9 may be a downhole motor and pump of an ESP and without an ESP protector or motor protector. Protective devices, such as a check valve, drain valve, etc. may be located above the motorized pump 300, 330, 500, 530, 800, 900 discharge in an ESP system. In examples, the check valve may close on shut down of the motorized pump. Lastly, examples of the motorized pumps do not have an integral canned electrical motor, generally or for surface applications.

The ESP system components may include the motorized pump 300, 330, 500, 530, 800, 900 and surface components 110, 218 such as surface controls. As discussed, the ESP may have surface components disposed at the Earth surface. A tubing head may support the downhole tubing provide a seal for the power cable to pass through the wellhead. The surface components (for example, components 110, 218) of the motorized pump 100, 300, 330, 500, 530, 800, 900 as an ESP system may include fixed-speed or variable-speed controllers and drives.

In certain embodiments, a smart or intelligent remote terminal unit (RTU) programmable controller (for fixed-speed or variable-speed) maintains flow of electricity to the motorized pump. The control package may facilitate the well to operate continuously or intermittently, or be shut off, provide protection from power surges or other electricity changes, and the like. A variable speed drive (VSD) may provide ESP systems substantially continuous duty-variable flow and pressure control.

In some embodiments, the power cable is connected to a top portion of the motor. The power cable may be strapped to the outside of the production tubing from the motor to the surface of the well, and extend on the surface to, for example, a control junction box. Power cables may have a metal shield to protect the cable from external damage. Electricity is typically provided to the site by a commercial power distribution system. ESP surface components may include an electrical supply system. In some examples, a transformer may convert the electricity provided via commercial power lines to match the voltage and amperage of the ESP motor.

Cables for sensor and control data may also be included. A submersible pump cable may be a product used for a submersible pump in a deep well. The size and shape of submersible pump cable can vary depending on the usage and pump instrument. Some types of pump cables include control wires as well as power conductors for the pump motor.

The ESP system may include a downhole sensor and companion surface interface unit to provide for retrieval of real-time system and wellbore performance parameters. Multi-data channel sensors can measure intake pressures, wellbore and motor winding temperature, pump discharge pressure, vibration, current leakage, and flow rate. ESP system control and alarms may be implemented via real-time monitoring of downhole readings. Surface interface can be accomplished via permanent digital readout, handheld data logger, or laptop computer, and so on. Remote monitoring of data from web-based computers is implemented in certain examples.

In general, the electrical submersible motorized pump as an ESP, may give artificial-lift for lifting moderate to high volumes of fluids from wellbores. These volumes may range from a low of 150 barrels/day (B/D) or 24 cubic meter/day (m3/d) to as much as 75,000 B/D or 12,300 m3/d. The aforementioned variable-speed controllers can in some arrangements extend the range.

The ESP may include a gas handling system which may reduce the free gas entering the pump. The gas handling system may include or be associated with a gas avoider, a gas separator such as a rotary and vortex gas separator, or gas handler such as a helico-axial gas handler.

Furthermore, the motor of the motorized pump 500 may be an induction (asynchronous) motor with the electromagnetic system including the motor stator 506 and motor rotor 508. One example is a squirrel-cage induction motor. The squirrel-cage rotor may have laminated steel in the core with bars, for example, evenly spaced bars of copper or aluminum. The bars may be slanted, or skewed, to reduce magnetic hum and slot harmonics in the assembly. The generated torque forces motion through the rotor to the load. Another example is wound rotor which may be a cylindrical core made of steel lamination with slots to hold the wires for its 3-phase windings.

In a three-phase induction machine, alternating current supplied to the motor stator windings energizes the stator to create a rotating magnetic flux. The flux generates a magnetic field in the air gap between the motor stator and the rotor and induces a voltage which produces current through the motor rotor bars. The motor rotor circuit is shorted and current flows in the rotor conductors. The action of the rotating flux and the current produces a force that generates a torque to drive the motor and thus drive the pump.

The discussion now turns to FIGS. 10-13 which are embodiments of motorized pumps that are multi-stage centrifugal pumps with radial integration of diffuser, motor, and impeller. Again, each of the multi-stage centrifugal pumps depicted in FIGS. 10-13, respectively, may be a motorized pump 100. In FIGS. 10-13, the motorized pump may be an ESP motorized pump without a motor protector. The multi-stage centrifugal pumps depicted in FIGS. 10-13 are shown with only one of the stages for clarity.

Figure 10:
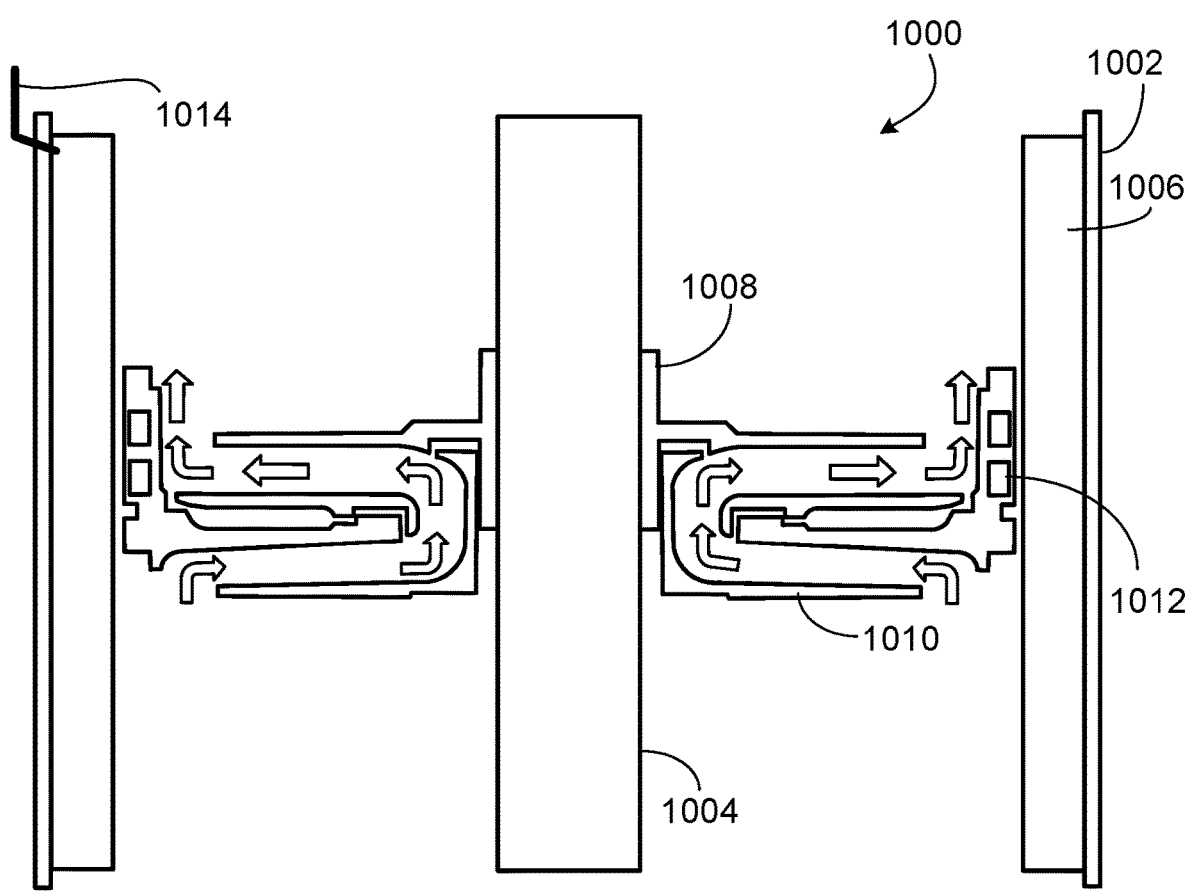
FIGS. 10-13 are diagrams of motorized pumps that are multi-stage centrifugal pumps.

FIG. 10 is a motorized pump 1000 having a multi-stage centrifugal pump. The motorized pump 1000 includes a housing 1002 and a shaft 1004. In embodiments, the shaft 1004 does not rotate in operation. The motorized pump 1000 includes a motor stator 1006 having laminations and windings, a pump diffuser 1008 (stationary), and a pump impeller 1010 with permanent magnets 1012. The motor stator 1006 radially surrounds the pump diffuser 1008 and the pump impeller 1010. In other words, the motor stator 1006 radially surrounds (encloses) the centrifugal pump. In operation, the permanent magnets 1012 on the impeller 1010 engage the motor stator 1006 for rotation of the impeller 1010.

The diffuser 1008 may be characterized as an internal diffuser 1008 in that the diffuser 1008 is adjacent the shaft 1004. The impeller 1010 may be characterized as an external impeller 1010 in that the impeller 1010 is adjacent the motor stator 1006, or in the sense that at least a portion of the impeller 1010 is radially to the outside of the internal diffuser 1008. Both the impeller 1010 and diffuser 1008 each have multiple vanes, though the vane geometries can be different.

The depiction in FIG. 10 is a simplified representation for clarity. While the internal diffuser 1008 may have a shape or features of an impeller, the diffuser 1008 vane geometry is configured to promote hydraulic flow and for pump efficiency. For example, the total flow area from entry to exit of the diffuser 1008 will be increasing to allow flow to slow down. The external impeller 1010 may have a shape or features of a diffuser but the impeller 1010 including impeller flow path and vane geometry promote hydraulic flow and pump efficiency. With respect to the internal diffuser 1008 and the external impeller 1010, the detailed van geometries (e.g., exit angle, flow areas) may be different because their functions are different. A function of the external impeller 1010 may be to accelerate the pump fluids to provide the fluids with kinetic energy. A function of the internal diffuser 1008 may be to slow down the fluids and transfer the kinetic energy to pump head or pressure.

In operation, as indicated, the pump impeller 1010 is made to rotate utilizing the electromagnetic coupling between the permanent magnets 1012 installed on the pump impeller 1010 with the magnetic fields of the motor stator 1006. The magnetic fields of the motor stator 1006 are generated by electrical power delivered with the power cable 1014. In embodiments, the external impeller 1010 is magnetic with permanent magnets 1012 disposed on at least a portion of the impeller 1010 body.

Figure 11:
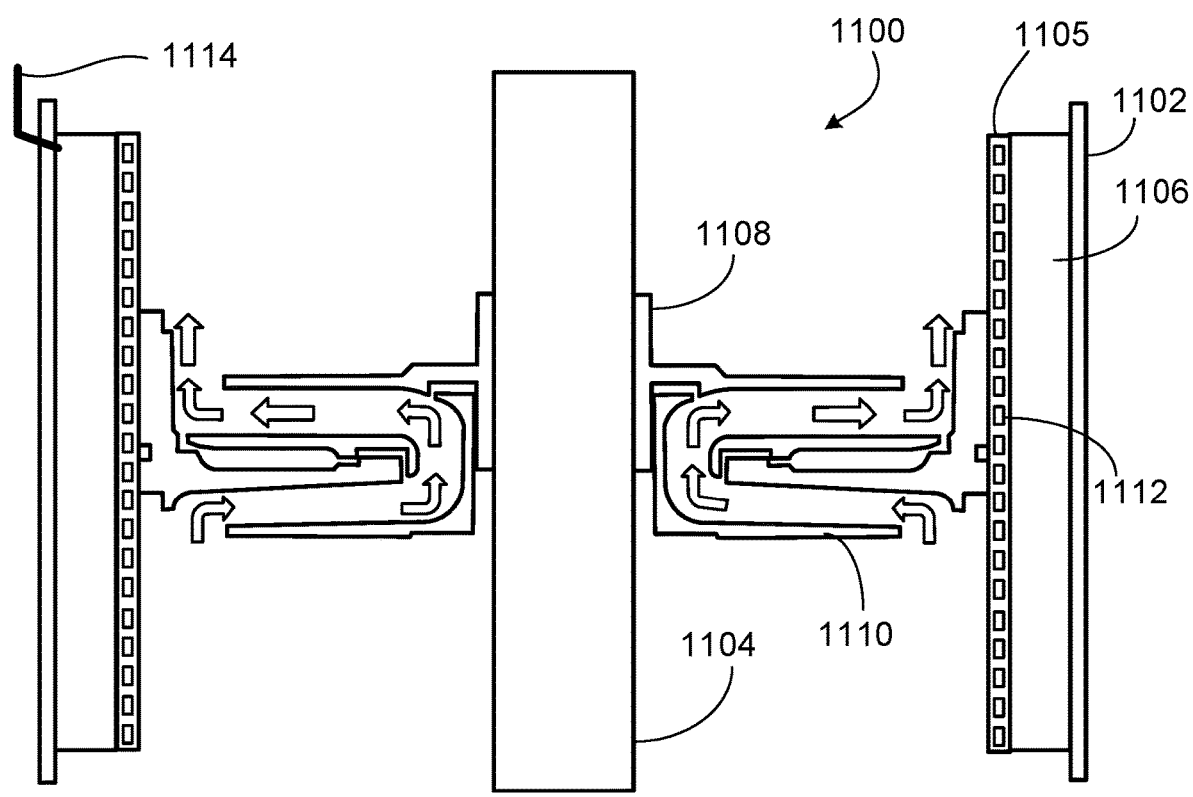

FIG. 11 is a motorized pump 1100 having a multi-stage centrifugal pump. The motorized pump 1100 has a housing 1102 and shaft 1104. In examples, the shaft 1104 does not rotate in operation. The motorized pump 1100 includes a motor having an annular motor rotor 1105 and a motor stator 1106. The motor stator 1106 has laminations and windings. The motorized pump 1100 has a power cable 1114 to supply power to the motorized pump 1100, such as from the Earth surface to the motorized pump 1100 employed downhole as an ESP motor/pump The motorized pump 1100 includes a pump having a pump diffuser 1108 (stationary) and a pump impeller 1110. The pump impeller 1110 is mechanically engaged with the motor rotor 1105 which has permanent magnets 1112. In the illustrated embodiment, the multi-stage centrifugal pump 1100 has the annular motor rotor 1105 which is fixed to the impeller 1110 so that both the motor rotor 1105 and the impeller 1110 rotate.

The motor stator 1106 radially surrounds the pump diffuser 1108 and the pump impeller 1110. In other words, the motor stator 1106 radially surrounds (encloses) the centrifugal pump. In some examples, both the motor rotor 1105 and the motor stator 1106 radially surround the pump. Thus, in those examples, the motor radially surrounds (radially encloses) the pump.

Moreover, as mentioned, the impeller 1110 is mechanically coupled to the motor rotor 1105. In operation, permanent magnets on the motor rotor 1105 engage the motor stator 1106 for rotation of the motor rotor 1105 and the impeller 1110.

The diffuser 1108 may be characterized as an internal diffuser 1108 in that the diffuser 1108 is adjacent the shaft 1104. The impeller 1110 may be characterized as an external impeller 1110 in that the impeller 1110 is adjacent the motor rotor 1105, or in the sense that at least a portion of the impeller 1110 is radially to the outside of the internal diffuser 1108. Both the impeller 1110 and diffuser 1108 each have multiple vanes, though the vane geometries can be different.

The depiction in FIG. 11 is a simplified representation for clarity. While the internal diffuser 1108 may have a shape or features of an impeller, the diffuser 1008 vane geometry is configured to promote hydraulic flow and for pump efficiency. The external impeller 1110 may have a shape or features of a diffuser but the impeller 1110 including its flow path and vane geometry promote hydraulic flow and pump efficiency. A function of the external impeller 1110 may to accelerate the pump fluids to provide the fluids with kinetic energy. A function of the internal diffuser 1108 may be to slow down the fluids and transfer the kinetic energy to pump head or pressure.

Figure 12:
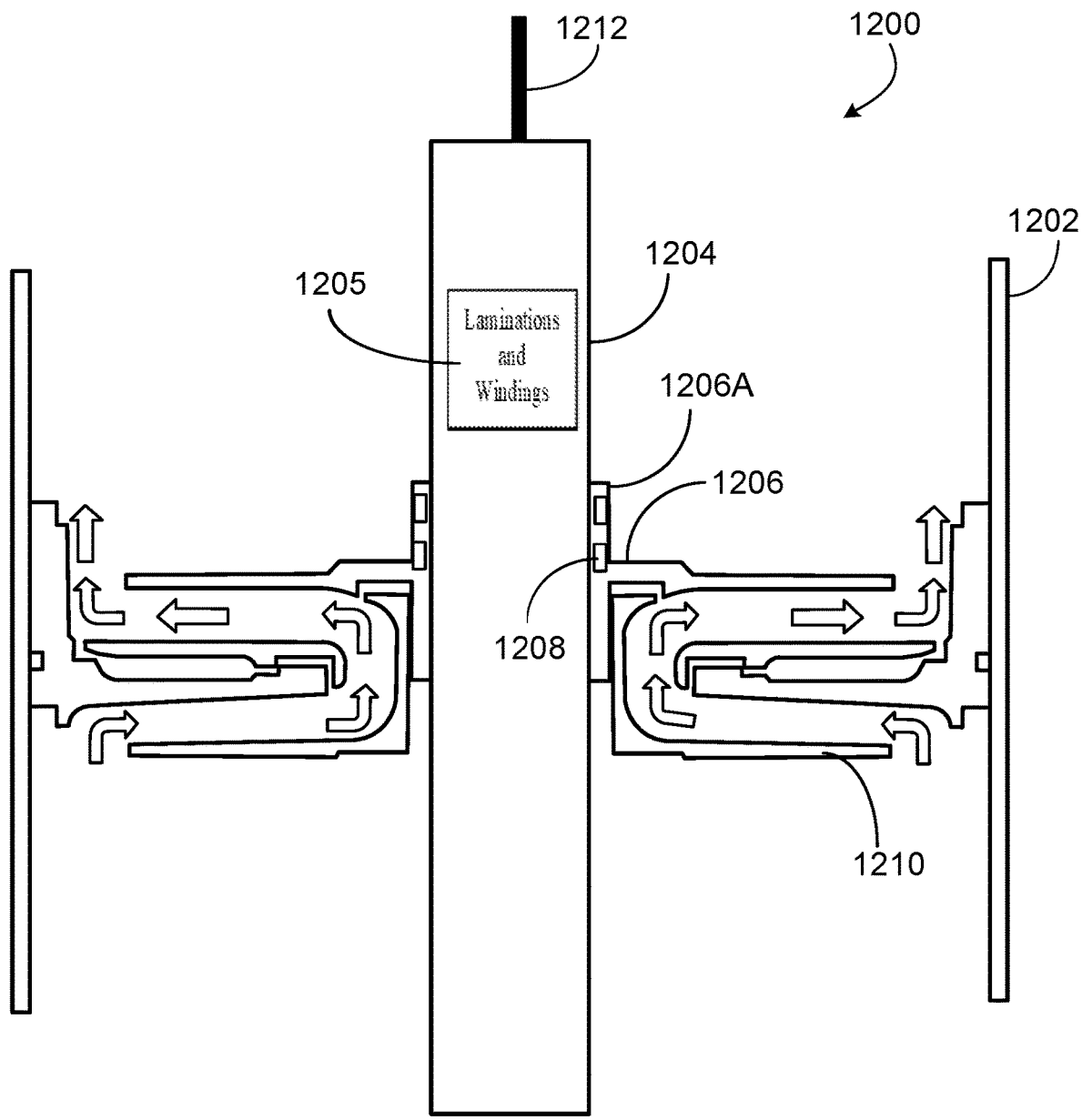

FIG. 12 is a motorized pump 1200 as a multi-stage centrifugal pump and with an external rotor topology to increase the OD of the pump portion. The motorized pump 1200 has an outer housing 1202. A motor stator 1204 is at the radial center of the motorized pump 1200. In examples, the motor stator 1204 has laminations and windings, as indicated by reference numeral 1205. Moreover, as depicted, the centrifugal pump may radially surround (radially enclose) the motor stator 1204. The motorized pump 1200 includes a pump having pump impeller 1206 with permanent magnets 1208 that engage the motor stator 1204 in operation for rotation of the impeller 1206. Thus, that portion of the impeller 1206 with the permanent magnets 1208 may be characterized as a motor rotor 1206A. Therefore, in examples, the pump impeller 1206 and the motor rotor 1206A are integrated as a single item or component of the motorized pump 1200. Further, the motorized pump 1200 has a diffuser 1210 with a flow path for the pumped fluid. In operation, the rotating impeller 1206 may interface with stationary diffuser 1210.

To increase the pump portion OD, the external rotor motor topology can be used for multi-stage centrifugal pumps, for example, as depicted in FIG. 12. In the illustrated embodiment, the permanent magnets 1208 are disposed on at least a portion of the impeller 1206 which is magnetic. In some embodiments, with this motor topology, the permanent magnets 1208 are in close proximity to the motor stator 1204 magnetic fields. The permanent magnets 1208 may be within 0.2 to 5 millimeters (mm) of the motor stator 1204. The pump 1200 has a power cable 1212 to supply power to the pump 1200, such as from the surface with the pump 1200 employed downhole as an ESP motor/pump.

Figure 13:
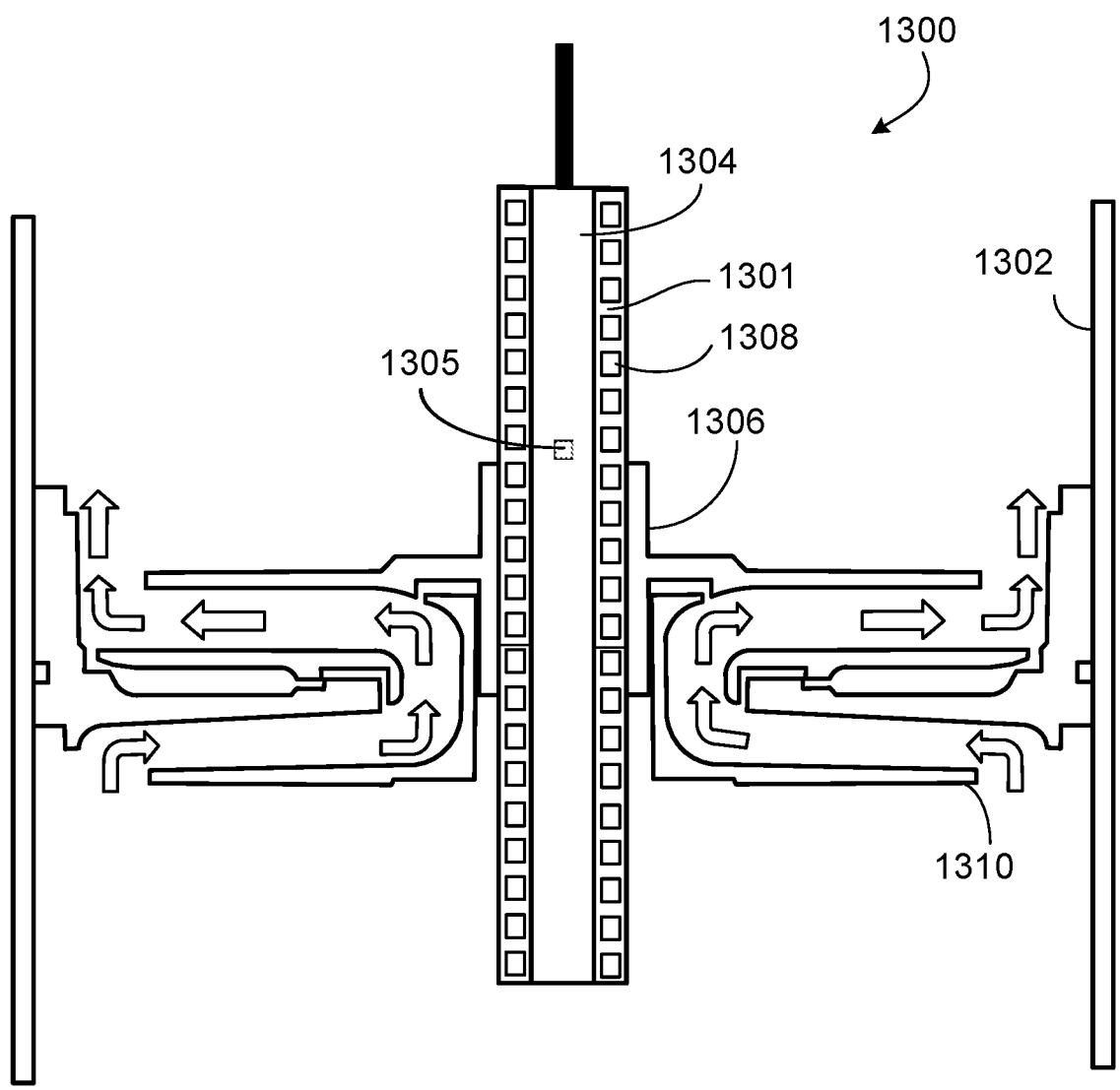

FIG. 13 is a motorized pump 1300 as a multi-stage centrifugal pump. The motorized pump has an outer housing 1302. In addition, the motorized pump 1300 has a motor having a motor rotor 1301 and a motor stator 1304 at the center. The motor stator 1304 has laminations and windings, as indicated by reference numeral 1305. Moreover, as depicted, the motor is radially surrounded (radially enclosed) by the centrifugal pump or pump portion. Permanent magnets 1308 are disposed on the motor rotor 1301 for the rotor 1301 to operationally engage the stator 1304 such that the rotor 1301 rotates in operation.

The rotor 1301 is mechanically coupled with the pump impeller 1306 such that impeller 1306 rotates with the rotor 1301. The motorized pump 1300 has the centrifugal pump including the impeller 1306 and a pump diffuser 1310. As indicated, the motor rotor 1301 is internally-radially magnetically coupled in operation with the motor stator 1304 and externally-radially mechanically coupled with the pump impellers 1306. In sum, the motorized pump 1300 is a multi-stage centrifugal pump with an external rotor topology, and pump impellers 1306 installed on motor rotor 1301.

Figure 13A:
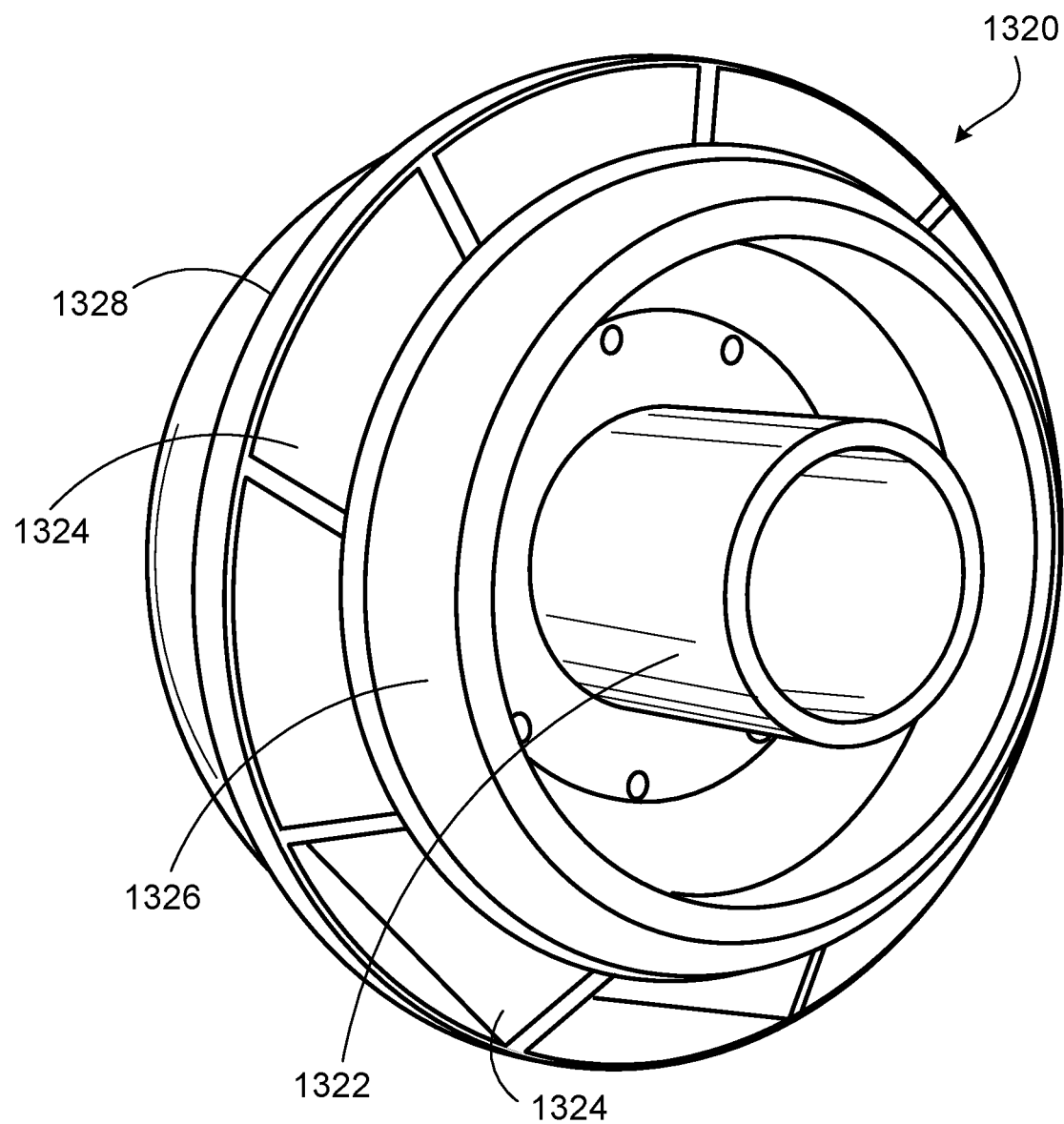
FIG. 13A is a perspective view of a hydraulic element of a motorized pump.

FIG. 13A is a representation of an exemplary pump hydraulic component 1320 for the motorized pumps of the preceding figures. For example, the pump hydraulic component 1320 may be the pump impeller 1306 of the motorized pump 1300 of FIG. 13, the pump impeller 1206 of the motorized pump 1200 of FIG. 12, internal diffuser 1108 of the motorized pump 1100 of FIG. 11, the intern al diffuser 1108 of the motorized pump 1000 of FIG. 10, and so on. A function of the hydraulic component 1320 as an impeller may be to accelerate the pump fluids to provide the fluids with kinetic energy. A function of the hydraulic component 1320 as a diffuser may be to slow down the fluids and transfers the kinetic energy to pump head or pressure.

The pump hydraulic component 1320 may be associated with motorized-pump central component 1322 such as shaft or other central components depicted in the preceding figures. The pump hydraulic component 1320 includes hydraulic elements 1324 such as blades or vanes. Further, in the illustrated example, the pump hydraulic component 1320 includes a front plate 1326 and optionally an outer shroud 1328. Lastly, while the depiction in FIG. 13A may resemble an impeller, the hydraulic elements 1322 (vanes) and associated flow paths can be configured as a diffuser that transfers the kinetic energy to pump head.

Variations of the motorized pumps of the preceding figures may be implemented. The motor stator and motor rotor can each be fully encapsulated to allow the air gap between them open to well fluids. Another option is to close the air gap and fill with dielectric oil. In the latter case, dynamic seals and elastomeric bags or metal bellows can be used for oil expansion and contraction. Pump axial thrust can be handled either at one location or at multiple locations.

Further, a sensor unit can be added to measure operating conditions. One or more sensors can be added to acquire data such as downhole pressure, temperature, vibration, pump fluid intake pressure and temperature, pump fluid discharge pressure, and other pump monitoring data. A downhole sensor can be attached to the motorized pump to transmit information such as intake pressure, intake temperature, motor temperature, motor vibration, etc. such as via the main power cable to the surface controls.

In summary, embodiments of the present techniques are a motorized pump which may have an integral motor rotor and pump rotor, and/or an external rotor motor. ESP reliability and rigless deployment may be addressed. The motorized pumps discussed above including with respect to the preceding figures may be employed as subsurface or downhole component(s) of an ESP, and may be coupled to or otherwise associated with ESP surface components. As discussed, the ESP surface components may include a motor controller which may be a fixed-speed controller or variable-speed controller, or other type of controller. The ESP system can include a variable frequency controller so that the ESP operates over a broader range of capacity, head, and efficiency. The speed of an ESP motor may be proportional to frequency of the electrical power supply. Thus, by adjusting the frequency, the speed can be adjusted, which may be a purpose of the variable speed system. Therefore, if the production capacity of a well is not precisely known, a variable speed controller can be selected for an estimated range of and adjusted for the desired production level once more data is available. Motor controllers may be digital controls having a system unit that performs shutdown and restart operations, and can be mounted, for example, in the low-voltage compartment of the control panel. In some examples, motor controllers may also include a display unit. This unit may display readings, set points, alarms, and so forth.

The wellhead and accessories may be based on casing size, tubing size, recommended load, surface pressure, and setting depth. Servicing equipment may include cable reels, reel supports, and cable guides. A bottom hole sensing device or downhole sensor may provide for continuous or substantially measurement of parameters such as bottom hole pressure, wellbore pressures, wellbore or ESP temperature, discharge flow rates, water contamination of the motor, equipment vibration, and automatic well monitoring. The aforementioned motor controllers may be available for the continuous monitoring of pump operations from a central location.

Figure 14:
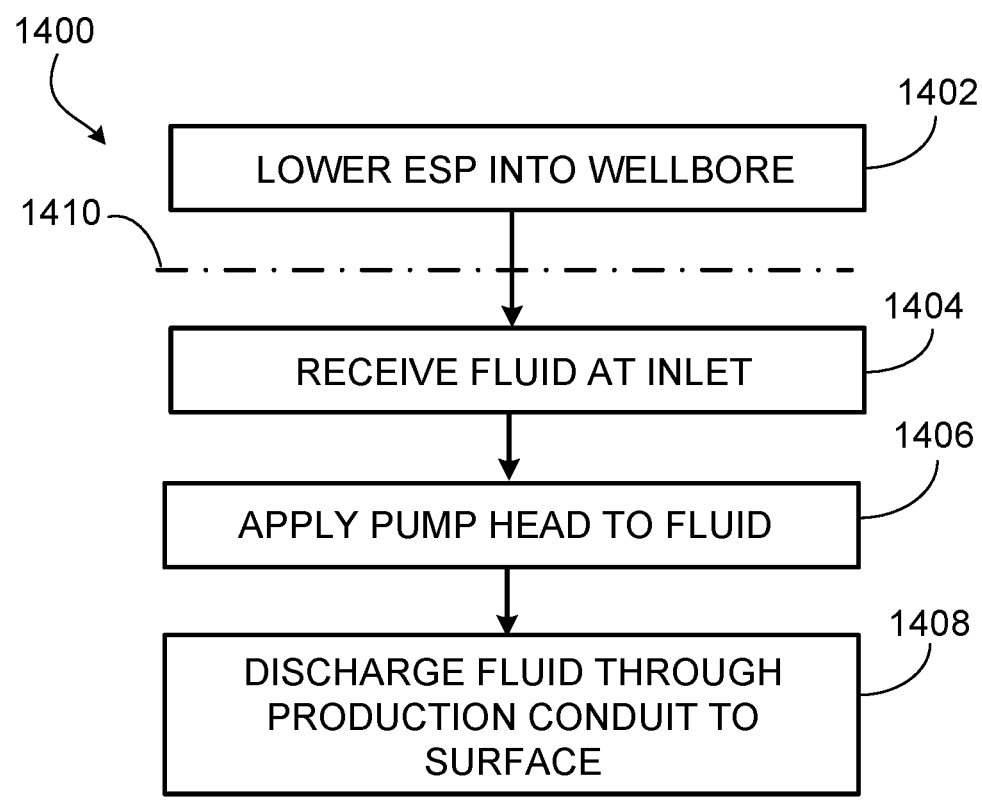
FIG. 14 is a block flow diagram of a method of operating an ESP having a motorized pump.

FIG. 14 is a method 1400 of operating an ESP or ESP system having a motorized pump with an integrated motor and pump. At block 1402, the subsurface components of the ESP are lowered into a wellbore. For instance, the ESP subsurface components, such as the motorized pump, while at the surface may be attached to the downhole end of a tubing string for deployment, and then lowered into the wellbore along with the tubing.

After being lowered (block 1402) into the wellbore and situated for operation, the well fluid to be pumped may be received (block 1404), for instance, from the Earth or formation through perforations in the well casing. The fluid may include hydrocarbon such as oil and gas, as well as contaminants and other compounds or production fluids. The action of the ESP lifting or pumping the well fluid or production fluid may be composed of the actions of blocks 1404, 1406, and 1408.

At block 1404, the fluid to be lifted or pumped is received at an inlet of the ESP pump and into the pump. The inlet may be a fluid intake or fluid suction, and may have a screen in certain examples. At block 1406, the ESP pump applies and imparts pump head to the pumped fluid. The ESP may provide pump head for the total dynamic head (TDH) to lift or pump the desired weight or volumetric capacity of production fluid. In some examples, the TDH may be or include the height in feet or meters of fluid being pumped. The applied head may include head to overcome friction losses in the production tubing and surface piping, and to overcome elevation changes.

At block 1408, the ESP discharges the pumped fluid through a production conduit to the surface. Lastly, the dashed line 1410 is denoted for some examples in which the method 1400 of FIG. 14 represents two general actions or methods. In other words, in those examples, a first action may be to lower 1402 the ESP subsurface components into a wellbore. A second general action may be to perform the pumping acts indicated in blocks 1404, 1406, and 1408.

An embodiment includes a method of operating an ESP that is a motorized pump, the method including pumping, by the motorized pump, fluid from a wellbore. The motorized pump has a motor and a pump that radially encloses the motor, wherein the motor has a motor rotor and a motor stator, and wherein the pump has a pump rotor with vanes integrated with the motor rotor. In some examples, an outer diameter or external surface of the motor rotor has the pump vanes giving the integral motor rotor and pump rotor. The pump may include a pump stator having vanes, wherein the pump stator vanes and the pump rotor vanes are radially outside of the motor stator.

The motor stator may typically have windings. The motor rotor may have permanent magnets and steel laminations, and wherein the pumping involves electromagnetic interaction between the motor stator magnetic fields and the permanent magnets, generating torque and rotation. Moreover, in examples, the ESP system or ESP motorized pump does not include a motor protector or ESP protector, or protection seal section.

The method may include lowering the motorized pump into the wellbore. The pumping may include receiving the fluid at an inlet suction of the motorized pump from perforations in a casing of the wellbore. The pumping may include lifting the fluid from the wellbore and discharging the fluid through a production conduit to an Earth surface. The fluid may include may include well production fluids, hydrocarbon, as oil and gas, etc.

The pumping may involve magnetic coupling between the motor and pump, wherein as the motor rotor and the pump rotor rotate, the vanes engage hydraulically with corresponding vanes on a stationary pump stator, moving pumped fluids. In certain examples, the motor stator has laminations, slots, and magnet wires with windings of the magnet wires such that electromagnetic fields project outward for engagement with the motor rotor that is an external motor rotor. The motorized pump may have a radial bearing disposed axially between two adjacent stages. Lastly, in a particular example, the motor (rotor) is a squirrel cage induction motor (rotor).

As indicated, an ESP legacy system may include a seal section or motor seal disposed between the pump and motor. However, as also indicated, such is not employed in certain embodiments of ESP motorized pumps of the present techniques. The seal section may be a protector, equalizer, balance chamber, and the like. The protector may be a labyrinth protector, bag protector, and so on. The protector may protect the motor from the well fluid, and provide pressure equalization between the conventional motor and the wellbore. The protector between the legacy motor and pump intake generally isolates the motor from the well fluid and may surround a thrust bearing. The seal section may protect the motor from contamination by well fluid, absorb thrust from the pump, and equalize pressure between the wellbore and motor. In all, conventional ESP systems may have a seal section or protector located between the motor and pump intake, and configured to perform one or more of the following: (1) house the thrust bearing that carries the axial thrust developed by the pump; (2) isolate and protect the motor from well fluids; (3) equalize the pressure in the wellbore with the pressure inside the motor; and (4) compensate for the expansion and contraction of motor oil due to internal temperature changes. Seal sections can be used in tandem configurations for motor protection and may be available as bag type or labyrinth-style to meet specific applications. Again, however, such seal sections or protectors are not employed in certain embodiments of the present ESP motorized pumps disclosed herein.

In applications with higher gas/oil ratios (GOR), the well fluid may contain significant amounts of free gas. A gas separator to separate the gas from the well fluid before the well fluid enters the pump may be added to or replace the intake section in such applications. However, as mentioned, a gas separator or compressor may not be needed with the ESP pump as a helico-axial pump. After all, the multi-stage helico-axial pump at relatively high speed can handle (process, pump) fluids having high free-gas content. Indeed, the helico-axial pump itself in particular examples may act as a compressor with respect to certain aspects. Yet, some ESPs may include a gas handler or gas separator at or near (or combined with) the pump intake or inlet. Gas separators may be employed where free gas causes interference with pump performance. The gas separator may separate some free gas from the fluid stream entering the pump to improve pump performance. However, in some examples of the pump as a helico-axial pump with no radial or mixed-flow pump, a gas separator is not employed. Indeed, some ESP embodiments with the helico-axial pump and permanent magnet motor (PMM) giving higher rotation speed (for example, at least 4500 rpm) do not have this gas separator because the need for such a gas separator may be precluded. In other words, significant benefit may not be realized with the gas separator in those particular examples.

In summary, an embodiment includes a motorized pump having a motor and a pump. In this embodiment, the pump surrounds the motor. The motor is an external rotor motor. The pump rotor (having vanes) is integrated with the motor rotor. Thus, the motor rotor and pump rotor may rotate together, the pump rotor to rotate within the pump stator. The pump stator having vanes on an inside diameter to engage with the pump rotor vanes to pump fluids. In one example, an outside diameter (OD) of the motor rotor is constructed with or integrated with the pump rotor. The motor rotor and pump rotor share a same rotor. In certain examples, the motorized pump is an ESP motor and pump and does not have an ESP motor protector, and wherein the motorized pump includes radially, from inside to outside, the motor stator, the motor rotor and the pump rotor, the pump stator, and a housing. Again, the pump may radially enclose the motor. In some examples, the motorized pump does not have a shaft coupling the motor to the pump. In particular examples, the motorized pump does not have a pump diffuser. Moreover, the motorized pump may be configured for deployment downhole riglessly with a power cable inside tubing. In examples, the motor rotor has permanent magnets and steel laminations. The steel laminations may have the permanent magnets mounted on an inside diameter (ID) portion, or embedded within, to engage electromagnetically with the motor stator. On the other hand, the motor rotor can be an induction type having steel laminations with copper bars and end ring. The motor stator may be at the radial center of the motorized pump, and wherein permanent magnets of the motor rotor and the vanes of the pump rotor are both on laminations of the motor rotor. In particular examples, the motorized pump does not have an outer housing.

Another embodiment is a motorized pump to pump fluid, including: a shaft disposed in a center portion of the motorized pump; a motor including a motor stator having laminations and windings; and a pump having an internal diffuser and an external impeller, wherein the motor stator radially surrounds the pump. The motorized pump has a housing radially enclosing the motor stator, the internal diffuser, and the external impeller, wherein the motor stator is disposed adjacent the housing. In examples, the pump is a multi-stage centrifugal pump, and wherein the motorized pump is an ESP motor and ESP pump and does not comprise an ESP motor protector. In some examples, the external impeller has permanent magnets to engage the motor stator via electromagnetic coupling to rotate the external impeller about the shaft, the external impeller comprising a flow path for fluid pumped by the motorized pump. The permanent magnets of the external impeller may form a motor rotor of the motor. In other examples, the motor has an annular motor rotor mechanically coupled to the external impeller, the annular motor rotor having permanent magnets to engage the motor stator to rotate the annular motor rotor and the external impeller about the shaft. In those examples, the permanent magnets may engage magnetic fields of the motor stator generated by electrical power delivered to the motor via a power cable, and wherein the motor radially encloses the pump. In implementations, the internal diffuser is disposed adjacent the shaft and has a hydraulic protrusion such as a vane or blade.

Yet another embodiment is a motorized pump including: a shaft disposed at a center portion of the motorized pump; a motor including a motor stator having laminations and windings; a pump that is a multi-stage centrifugal pump having multiple hydraulic stages, each stage including an internal diffuser and an external impeller, the external impeller for fluid pumped by the motorized pump; and a housing radially enclosing the motor stator, the internal diffusers, and the external impellers, wherein the motor stator radially encloses the pump. In examples, the internal diffuser has a vane or blade. In implementations, the external impeller has permanent magnets to engage the motor stator via electromagnetic coupling to rotate the external impeller about the shaft. In certain examples, the motor has an annular motor rotor mechanically coupled to the external impeller, the annular motor rotor having permanent magnets to engage the motor stator via electromagnetic coupling to rotate the annular motor rotor and the external impeller about the shaft. In examples, motor radially surrounds the pump. In some implementations, the motor has an annular motor rotor comprising permanent magnets to engage the motor stator via electromagnetic coupling to rotate the annular motor rotor around the shaft, wherein the external impeller is mechanically coupled to the annular motor rotor to rotate with the annular motor rotor around the shaft, and wherein the annular motor rotor has steel laminations. In certain examples, the motorized pump is an ESP motorized pump and does not have an ESP motor protector.

Yet another embodiment is a method of operating an electrical submersible pump (ESP) having a motorized pump, the method including pumping, by the motorized pump of the ESP, production fluid from a wellbore, wherein the motorized pump comprises a pump and a motor stator radially enclosing the pump, the pump comprising an external impeller and an internal diffuser, wherein the pumping involves receiving the production fluid at an inlet of the pump, receiving the production fluid at the external impeller and rotating the external impeller around a shaft of the motorized pump, and flowing the production fluid through a flow path of the internal diffuser. In examples, the method includes lowering the motorized pump into the wellbore, wherein the motor stator has windings, wherein the ESP does not comprise a motor protector, and wherein receiving the production fluid at the inlet involves receiving the production fluid (for example, hydrocarbon) from perforations in a casing of the wellbore. In implementations, the pump is a multi-stage centrifugal pump, wherein the pumping includes discharging the production fluid through a production conduit to an Earth surface, wherein the production fluid includes oil and gas, and wherein the motorized pump does not have a motor protector section. The rotating of the external impeller may be by engaging permanent magnets of the external impeller with the motor stator via electromagnetic coupling to rotate the external impeller around the shaft. In examples, the motor has an annular rotor motor mechanically coupled to the external impeller, wherein rotating the external impeller involves engaging permanent magnets of the annular motor rotor via electromagnetic coupling to rotate the annular motor rotor and the external impeller around the shaft, and wherein the motor radially surrounds the pump. The method may include receiving electricity via a power cable to the motor and generating, via the electricity, magnetic fields of the motor stator, wherein the internal diffuser is disposed adjacent the shaft and has a vane or blade.

A number of implementations have been described. Nevertheless, it will be understood that various modifications may be made without departing from the spirit and scope of the disclosure.

What is claimed is:

1. An electrical submersible pump (ESP) comprising:
a motorized pump comprising an external rotor motor topology, wherein the motorized pump to fit into a casing in a wellbore to pump fluid from the wellbore, the motorized pump comprising:
a motor comprising a motor stator and a motor rotor, wherein the motor stator is at a radial center of the motorized pump, and wherein the motor stator comprises laminations and windings;
a centrifugal pump radially surrounding the motor stator, the centrifugal pump comprising a pump impeller and a pump diffuser, wherein the pump diffuser comprises a flow path for the fluid as pumped, and wherein in operation the pump impeller rotates and interfaces with the pump diffuser; and
a housing radially enclosing the motor stator, the motor rotor, the pump impeller, and the pump diffuser, wherein the pump diffuser is adjacent the housing, and wherein the centrifugal pump comprise a discharge for the fluid on a longitudinal end portion of the motorized pump.

2. The ESP of claim 1, wherein the pump impeller is adjacent the motor stator, wherein the pump impeller comprises permanent magnets to engage the motor stator in operation for rotation of the pump impeller, and wherein the motor rotor and the pump impeller are integrated.

3. The ESP of claim 2, wherein the motor rotor is integrated with the pump impeller by the motor rotor comprising a portion of the pump impeller having the permanent magnets.

4. The ESP of claim 3, wherein the permanent magnets are disposed on a surface of the pump impeller, and wherein the portion of the pump impeller having the permanent magnets is magnetic.

5. The ESP of claim 2, wherein the permanent magnets are within a distance from the motor stator in a range of 0.2 millimeter (mm) to 5 mm, and wherein the permanent magnets to engage the motor stator comprises the permanent magnets to engage a magnetic field generated by the motor stator in operation.

6. The ESP of claim 1, wherein the centrifugal pump radially surrounds the motor, wherein the motor rotor is adjacent the motor stator, wherein the motor rotor comprises permanent magnets to operationally engage the motor stator for the motor rotor to rotate in operation, and wherein the pump impeller is mechanically coupled to the motor rotor for the pump impeller to rotate with the motor rotor.

7. The ESP of claim 6, wherein the pump impeller mechanically coupled to the motor rotor comprises the motor rotor is externally-radially mechanically coupled with the pump impeller, and wherein in operation the motor rotor is internally-radially magnetically coupled with the motor stator.

8. The ESP of claim 1, wherein the motorized pump to be rigless deployed into the wellbore, wherein the centrifugal pump is a multi-stage centrifugal pump, wherein the fluid comprises hydrocarbon, and wherein the motorized pump does not comprise an ESP motor protector.

9. An electrical submersible pump (ESP) comprising:
a motorized pump comprising an external rotor motor topology, wherein the motorized pump to fit into a casing in a wellbore to pump fluid from the wellbore, the motorized pump comprising:
a motor comprising a motor stator and a motor rotor, wherein the motor stator is at a radial center of the motorized pump, the motor stator comprising laminations and windings;
a centrifugal pump radially surrounding the motor stator, the centrifugal pump comprising:
a pump impeller adjacent the motor stator, the pump impeller comprising permanent magnets to engage the motor stator in operation for rotation of the pump impeller, wherein the motor rotor is integrated with the pump impeller in comprising a portion of the pump impeller having the permanent magnets; and
a pump diffuser comprising a flow path for the fluid as pumped, wherein the pump impeller as rotating in operation to interface with the pump diffuser as stationary; and
a housing radially enclosing the motor stator, the motor rotor, the pump impeller, and the pump diffuser, wherein the pump diffuser is adjacent the housing.

10. The ESP of claim 9, wherein the permanent magnets are disposed on a surface of the pump impeller, and wherein the portion of the pump impeller having the permanent magnets is magnetic.

11. The ESP of claim 9, wherein the permanent magnets are within a distance from the motor rotor in a range of 0.2 millimeter (mm) to 5 mm, and wherein the permanent magnets to engage the motor stator comprises the permanent magnets to engage a magnetic field generated by the motor stator in operation.

12. The ESP of claim 9, wherein the motorized pump to be rigless deployed into the wellbore, wherein the centrifugal pump is a multi-stage centrifugal pump, and wherein the motorized pump does not comprise an ESP motor protector.

13. The ESP of claim 9, wherein the motorized pump to be run on a production string into the wellbore, and wherein the centrifugal pump comprises an inlet to receive the fluid, the inlet comprising an intake screen.

14. An electrical submersible pump (ESP) comprising:
a motorized pump comprising an external rotor motor topology, wherein the motorized pump to fit into a casing in a wellbore to pump fluid from the wellbore, the motorized pump comprising:
a motor comprising:
a motor stator at a radial center of the motorized pump, the motor stator comprising laminations and windings; and
a motor rotor adjacent the motor stator, the motor rotor comprising permanent magnets to operationally engage the motor stator for the motor rotor to rotate in operation; and
a centrifugal pump radially surrounding the motor, the centrifugal pump comprising:
a pump impeller mechanically coupled to the motor rotor for the pump impeller to rotate with the motor rotor; and
a pump diffuser comprising a flow path for the fluid as pumped, wherein the pump impeller as rotating in operation interfaces with the pump diffuser as stationary; and
a housing radially enclosing the motor stator, the motor rotor, the pump impeller, and the pump diffuser, wherein the pump diffuser is adjacent the housing.

15. The ESP of claim 14, wherein the pump impeller mechanically coupled to the motor rotor comprises the pump impeller installed on the motor rotor.

16. The ESP of claim 14, wherein the permanent magnets to operationally engage the motor stator comprises the permanent magnets to operationally engage magnetic fields generated by the motor stator.

17. The ESP of claim 14, wherein the motor rotor is internally-radially magnetically coupled in operation with the motor stator and externally-radially mechanically coupled with the pump impeller.

18. The ESP of claim 14, wherein the centrifugal pump comprises a multi-stage centrifugal pump.

19. The ESP of claim 18, wherein the pump impeller comprises multiple pump impellers arranged axially along the motor rotor, and wherein the motor rotor is internally-radially magnetically coupled in operation with the motor stator and externally-radially mechanically coupled with the multiple pump impellers.

20. The ESP of claim 14, wherein the motorized pump to be deployed via a tubing string into the wellbore.

21. A method of operating an electrical submersible pump (ESP) comprising a motorized pump, the method comprising:
lowering the motorized pump of the ESP into a wellbore in a geological formation, the motorized pump comprising permanent magnets and an external rotor motor topology, wherein the motorized pump comprises:
a motor comprising a motor rotor and a motor stator, the motor stator at a radial center of the motorized pump, wherein the motor stator comprises laminations and windings;
a centrifugal pump radially surrounding the motor stator, the centrifugal pump comprising a pump impeller and a pump diffuser; and
a housing radially enclosing the motor stator, the motor rotor, the pump impeller, and the pump diffuser, wherein the pump diffuser is adjacent the housing; and
pumping, by the motorized pump, production fluid from the wellbore to Earth surface, wherein the pumping comprises:
receiving the production fluid from within the wellbore at an inlet of the centrifugal pump;
flowing the production fluid through a flow path of the pump diffuser;
rotating the pump impeller via the motor, the pump impeller interfacing with the pump diffuser; and
discharging the production fluid from the centrifugal pump through a production conduit in the wellbore to the Earth surface.

22. The method of claim 21, wherein the pump impeller is adjacent the motor stator, and wherein the pump impeller comprises the permanent magnets.

23. The method of claim 22, wherein rotating the pump impeller comprises the permanent magnets of the pump impeller engaging the motor stator via electromagnetic coupling to rotate the pump impeller around the motor stator.

24. The method of claim 23, wherein the motor rotor and the pump impeller are integrated.

25. The method of claim 22, wherein rotating the pump impeller via the motor comprises the motor stator generating a magnetic field and the permanent magnets engaging the magnetic field to rotate the pump impeller, and wherein the motor rotor is integrated with the pump impeller in comprising a portion of the pump impeller having the permanent magnets.

26. The method of claim 22, wherein the permanent magnets are disposed on a surface of the pump impeller, and wherein the permanent magnets are within a distance from the motor stator in a range of 0.2 millimeter (mm) to 5 mm.

27. The method of claim 21, wherein the centrifugal pump radially surrounds the motor, wherein the motor rotor comprises the permanent magnets and is adjacent the motor stator, and wherein the pump impeller is mechanically coupled to the motor rotor for the pump impeller to rotate with the motor rotor.

28. The method of claim 27, wherein rotating the pump impeller via the motor comprises the motor stator generating a magnetic field and the permanent magnets engaging the magnetic field to rotate the motor rotor and the pump impeller.

29. The method of claim 28, wherein the motor rotor is magnetically coupled with the motor stator.

30. The method of claim 27, wherein rotating the pump impeller comprises electromagnetic coupling of the permanent magnets with motor stator.

31. The method of claim 21, wherein the centrifugal pump comprises a multi-stage centrifugal pump, and wherein lowering the motorized pump into the wellbore comprises rigless deployment of the motorized pump into the wellbore.

32. The method of claim 21, comprising receiving the production fluid from the geological formation into the wellbore through perforations in a casing of the wellbore, wherein the production fluid comprises hydrocarbon.

33. The method of claim 21, wherein the production fluid comprises oil and gas, wherein lowering the motorized pump into the wellbore comprising lowering the motorized pump into a casing of the wellbore, and wherein the motorized pump does not comprise a motor protector section.

34. The method of claim 21, comprising receiving electricity via a power cable to the motor and generating, via the electricity, magnetic fields by the motor stator, wherein the inlet comprises an intake screen.

\* \* \* \* \*